(12) United States Patent
Kitamura et al.

(10) Patent No.: US 6,434,495 B1
(45) Date of Patent: Aug. 13, 2002

(54) TWO-PHASE HEAT-FLOW ANALYZING METHOD AND THE APPARATUS THEREOF

(75) Inventors: Masashi Kitamura; Takaya Yamamoto, both of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/368,564

(22) Filed: Aug. 5, 1999

(30) Foreign Application Priority Data

Oct. 7, 1998 (JP) .......................................... 10-285407

(51) Int. Cl.[7] .......................... G06F 17/00; G05B 23/02
(52) U.S. Cl. ........................ 702/50; 702/55; 73/861.04; 340/618
(58) Field of Search .............................. 702/50, 47, 55; 73/66, 195, 200, 290, 290 R, 290 V, 861.04; 703/2, 9.5; 340/618, 620

(56) References Cited

U.S. PATENT DOCUMENTS 5,741,980 A * 4/1998 Hill et al. ................. 73/861.04

OTHER PUBLICATIONS

Andreussi, P et al; "An investigation of void fraction in liquid slugs for horizontal and inclined gas–liquid pipe flow"; International Journal of Mulitphase Flow (Nov.–Dec. 1989), vol. 15, No. 6, ABSTRACT.*

Idaho National Engineering Laboratory, RELAP5MOD3 Code Manual, Models and Correlations, NUREG/CR–5535, 3 pages, (1995).

"Fluid Behavior in Pressure Vessel during Blowdown", Tatsuo Kagawa et al, Journal of Japan Nuclear Power Society, 20, No. 6, (1978), pp. 64–70.

* cited by examiner

Primary Examiner—Kamini Shah
(74) Attorney, Agent, or Firm—Oblon, Spivak, McClelland, Maier & Neustadt, P.C.

(57) ABSTRACT

A method of analyzing heat and mass transfer in gas-liquid two-phase flow in an object transfer system includes dividing the object heat transfer system into a plurality of nodes, calculating a void fraction in a gaseous phase above a liquid surface of a node and calculating a void fraction in another node beneath the first node, and calculating a liquid surface level based on the results of the previous steps.

8 Claims, 22 Drawing Sheets

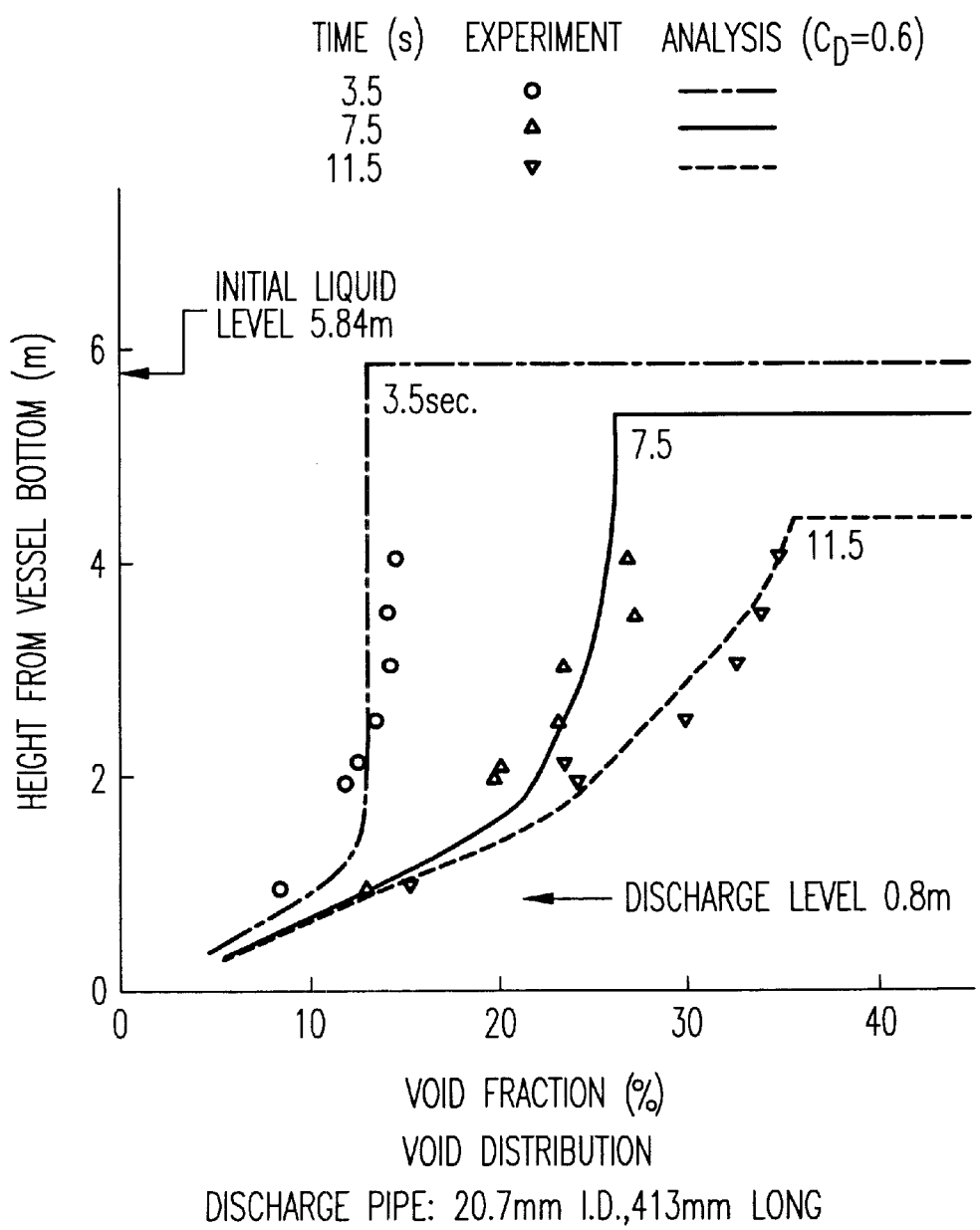

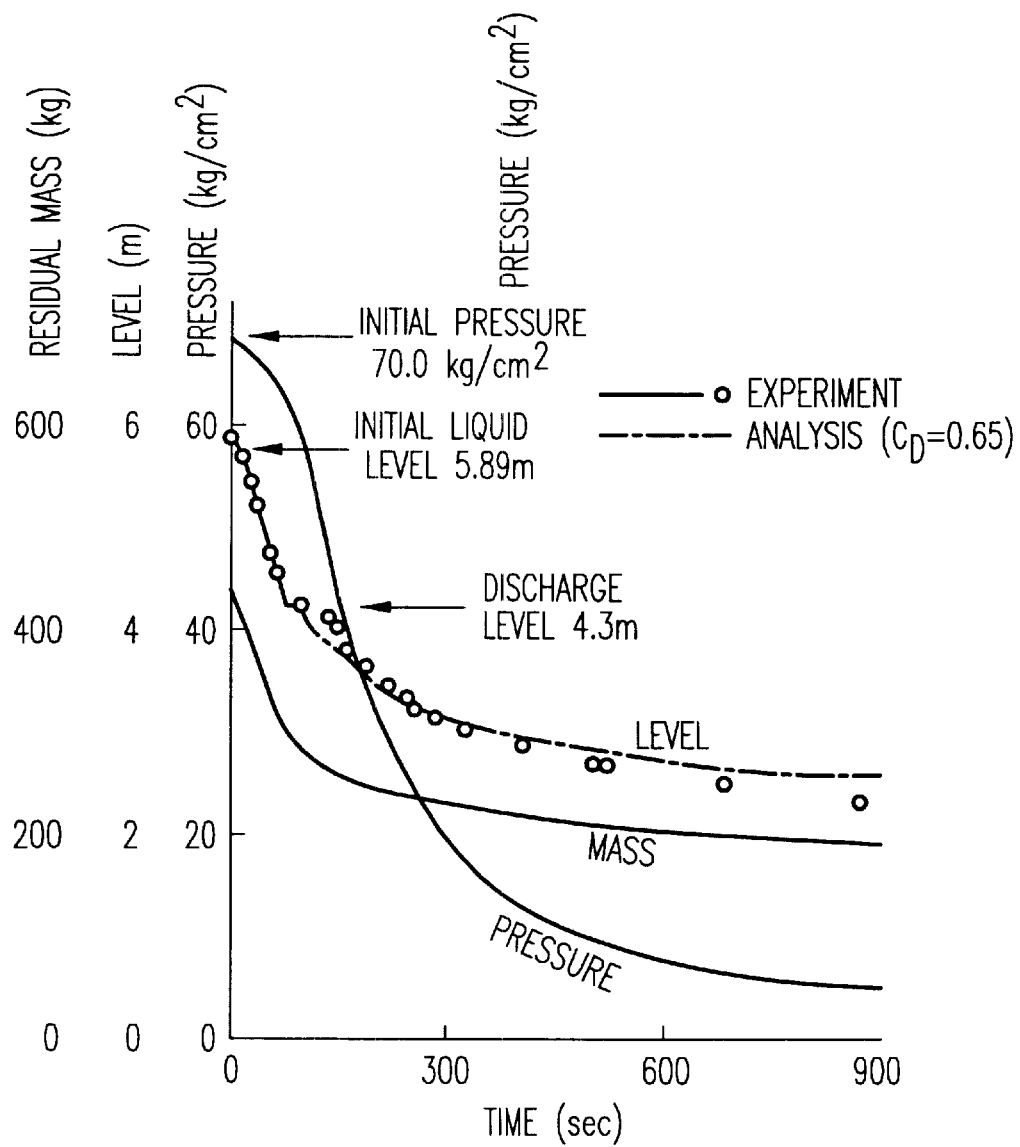

INTERMEDIATE BLOWDOWN RESULTS (I)

VOID FRACTION

DISCHARGE PIPE: 10.1mm I.D., 419mm LONG
INITIAL LIQUID LEVEL IS HIGHER THAN DISCHARGE LEVEL

PRESSURE, TWO-PHASE LEVEL AND RESIDUAL MASS

DISCHARGE ORIFICE: 15.0mm DIE

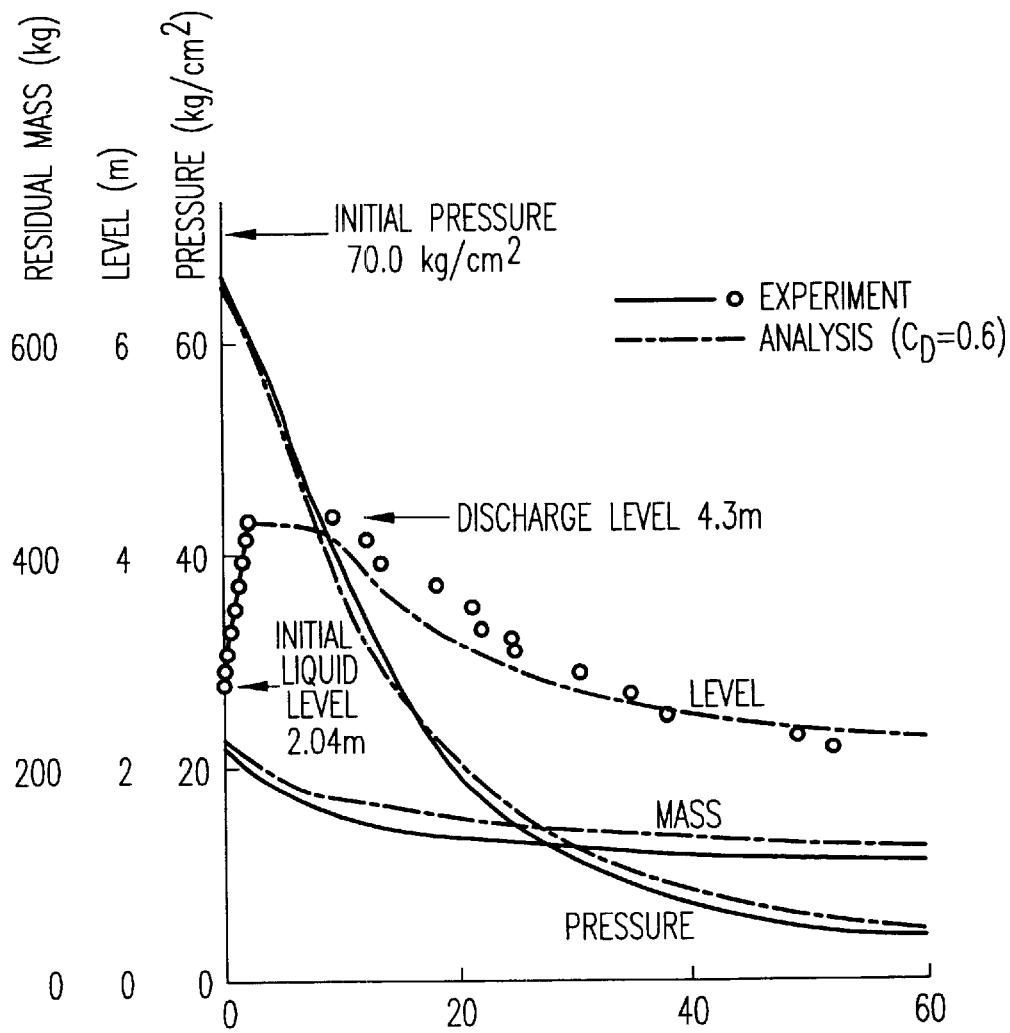

TWO-PHASE HEAT-FLOW ANALYZING METHOD AND THE APPARATUS THEREOF

BACKGROUND OF THE INVENTION

The present invention relates to a heat-flow analyzing method which is used for a plant simulation, etc. in the design evaluation, operation training, etc. of a heat transporting system in a power plant and which is required to correctly evaluate the liquid surface in a container containing a gaseous phase under the liquid surface, and also concerns an apparatus for carrying out such an analysis.

Heat-flow simulations have been generally carried out in which, in order to predict and estimate the behaviors of a fluid flowing through heat-transporting equipment such as pipes and containers in a plant, the pipes and containers are divided into a plurality of volume elements that are referred to as nodes, and conservation equations relating to the mass, the energy and the amount of motion in each node are used so as to carry out analyses. In this case, the analyses are carried out assuming that the pressure, the temperature and the void fraction (the ratio of existence of the gaseous phase in a mixed state of a gaseous phase and a liquid phase) are uniform inside each node. The assumption that the inside of each node is maintained uniform is appropriate when a flow is exerted through the pipes and containers; however, when a liquid surface exists, the assumption is not appropriate since the void fraction drastically changes due to the rise and drop of the liquid surface. For example, in a case where the void fraction drops, if the drastic changes in the void fraction at the liquid surface is not taken into consideration, the void fraction in an upper node tends to start dropping before a lower node has been filled with the liquid, thereby failing to correctly simulate the behaviors of the liquid surface. For this reason, conventionally, models for taking the liquid surface into consideration are incorporated into various analysis codes. For example, in TRAC-BF1/MOD1 which is a typical heat-flow analysis code used in the gas-liquid two-phase flow analysis in the nuclear power plant, the following liquid-surface model is incorporated in accordance with the nuclear-plant designing standard NUREG/CR-4391 (1992). Supposing that there is no change in the flow-passage area, that the void fraction distribution shows a normal distribution in which the void fraction increases as the level becomes higher, and that as illustrated in FIG. 2, the node number reduces as the level becomes higher, when the void fraction a satisfies the following inequalities:

$\alpha_{j+1} < \alpha_j < \alpha_{j-1}$, and $(\alpha_{j-1} - \alpha_j > 0.2$ or $\alpha_j - \alpha_{j+1} > 0.2)$, and $\alpha_{j-1} > 0.7$, a judgement is made that the liquid surface is located at node j. Moreover, with respect to the node that is judged as having the liquid surface, supposing that the void fraction is represented by $\alpha_+$ above the level and $\alpha_-$ below the level, the discharge rate between the nodes is found. Here, $\alpha_+$ and $\alpha_-$ are values that satisfy $0 \leq \alpha_- < \alpha_j < \alpha_+ \leq 1$.

In FIG. 11, reference numeral 1 represents an upper node in the case of no liquid surface model incorporated, reference numeral 2 represents a node that is originally supposed to have a liquid surface, reference numeral 3 represents a lower node, reference numeral 4 is a passage between 2 and 1, and reference numeral 5 represents a passage between 2 and 3. Moreover, reference numeral 7 represents an upper node in the case when a liquid surface model is incorporated, reference numeral 8 is a liquid surface node, reference numeral 9 represents a lower node, reference numeral 10 is a passage between 7 and 8, and reference numeral 11 is a passage between 8 and 9. Reference numeral 12 represents a liquid surface. An arrow on the junction 10 or 11 shows a flow direction which is taken to be positive in the calculation.

A conventional liquid-surface analyzing method and apparatus has a structure as described above, and there are many values which have been set based upon experience; therefore, in the case of a difference between the size of nodes and the tendency of the void distribution, it becomes difficult to make proper evaluation, and the analysis model needs to be adjusted every time it is set. Moreover, another disadvantage is that the range of conditions for correct operation of the liquid surface model is limited. In the conventional technique, it is mainly applied to an analysis model in which its range of use is limited as in the case of a numerical analysis, etc., and in most cases, the results of analysis are evaluated by experienced designers familiar with the analysis model; therefore, these problems are permissible. However, in the case of application to an analysis model used as a plant simulator, first, the range of use is not limited, and second, the users, who are operators, etc., in most cases, tend to be completely ignorant about the analysis model; therefore, the method has to make correct evaluation on the liquid surface in general in all cases.

More specifically, in the case when a liquid surface is formed in pipes and containers in a plant, there is a case in which a gaseous phase and a liquid phase are completely separated from each other above and below the liquid surface, or there is a case in which a large number of voids are included below the liquid surface as seen in a depressurized boiling state; therefore, a liquid-surface evaluation method which can evaluate. the liquid surface correctly in general in all operation conditions in a plant is demanded. Moreover, it is also necessary to take it into account the following point: in a pipe or a tank in which water below a saturation temperature and vapor are located with the liquid surface in between, since heat transfer between the gas and liquid is carried out only by the liquid surface, the temperature of the liquid phase is maintained at not more than the saturation temperature for a long time, while in the case when a large number of bubbles are located below the liquid surface as seen in a depressurized boiling state, since the gas-liquid interfacial area is represented by the sum of the bubble surfaces and liquid surface, the heat transfer between the gas and liquid takes place rapidly. Moreover, in the case when a liquid surface model is incorporated, in particular, if the liquid surface shifts in a manner bridging a node, a switchover is made from the liquid surface node to the normal node (the node which does not include the liquid surface); and at this time, it is necessary to avoid the analysis from becoming unstable due to drastic changes in the gas-liquid interfacial area.

The present invention has been devised in order to solve the above-mentioned problems with the conventional heat-flow analyzing method for two gaseous and liquid phases and the apparatus thereof, and its objective is to provide a heat-flow analyzing method for two gaseous and liquid phases which can evaluate the position of the liquid surface and its shift correctly whether or not bubbles exist below the liquid surface, and which can also evaluate the heat transfer between the two gaseous and liquid phases correctly, or an apparatus used in such a method.

SUMMARY OF THE INVENTION

In the two-phase heat-flow analyzing method related to the first arrangement of the present invention which is a method for analyzing the heat-transfer behaviors of a two-phase fluid flowing through heat-transport equipment, the heat-transport equipment is divided into a plurality of nodes, the void fraction of a gaseous phase above the liquid surface of a node possessing the liquid surface and the void fraction below the liquid surface thereof are calculated based upon the void fraction of the node in question and the void fraction of a node below the node in question, and based upon the results of the calculations, the position of a liquid surface inside the heat-transport equipment is calculated.

Moreover, in the two-phase heat-flow analyzing method related to the second arrangement of the present invention, based upon the void fractions of a target node to be judged and nodes located above and below the target node, a judgement is made as to whether or not the target node possesses a liquid surface.

Furthermore, in the two-phase heat-flow analyzing method related to the third arrangement of the present invention, based upon the respective void fractions of a target node to be judged and a node located below the target node, the void fraction of a gaseous phase above the liquid surface of the target node and the void fraction below the liquid surface are calculated, and based these void fractions, a judgement is made as to whether or not the target node possesses a liquid surface.

In the two-phase heat-flow analyzing method related to the fourth arrangement of the present invention, with respect to the node possessing a liquid surface, the quantity of heat transfer between the two gas-liquid phases is calculated based upon the void fraction of a gaseous phase above the liquid surface and the void fraction below the liquid surface.

Moreover, in the two-phase heat-flow analyzing apparatus of the fifth arrangement of the present invention which is an apparatus for analyzing the heat-transfer behaviors of a two-phase fluid flowing through heat-transport equipment, the heat-transport equipment is divided into a plurality of nodes, the void fraction of a gaseous phase above the liquid surface of a node possessing the liquid surface and the void fraction below the liquid surface thereof are calculated based upon the void fraction of the node in question and the void fraction of a node below the node in question, and based upon the results of the calculations, the position of a liquid surface inside the heat-transport equipment is calculated.

Moreover, in the two-phase heat-flow analyzing apparatus related to the sixth arrangement of the present invention, based upon the void fractions of a target node to be judged and nodes located above and below the target node, a judgement is made as to whether or not the target node possesses a liquid surface.

Furthermore, in the two-phase heat-flow analyzing apparatus related to the seventh arrangement of the present invention, based upon the respective void fractions of a target node to be judged and a node located below the target node, the void fraction of a gaseous phase above the liquid surface of the target node and the void fraction below the liquid surface are calculated, and based upon these void fractions, a judgement is made as to whether or not the target node possesses a liquid surface.

In the two-phase heat-flow analyzing apparatus related to the eighth arrangement of the present invention, with respect to the node possessing a liquid surface, the quantity of heat transfer between the two gas-liquid phases is calculated based upon the void fraction of a gaseous phase above the liquid surface and the void fraction below the liquid surface.

Referring to Figures, the following description will discuss embodiments of the present invention in detail.

BRIEF EXPLANATION OF THE DRAWINGS

FIG. 11($b$) is a diagram showing a concept of modeling in liquid-surface evaluation in conventional two-phase heat-flow analysis in a case where a liquid-surface model is incorporated.

FIG. 13($b$) is a graph of top blowdown results showing void distribution according to the background art.

FIG. 14($b$) is a graph of bottom blowdown results showing void distribution according to the background art.

FIG. 15($b$) is a graph of intermediate blowdown results showing void fraction according to the background art.

FIG. 16($b$) is a further graph of intermediate blowdown results showing void fraction according to the background art.

DETAILED DESCRIPTION

Embodiment 1

Figure 1:
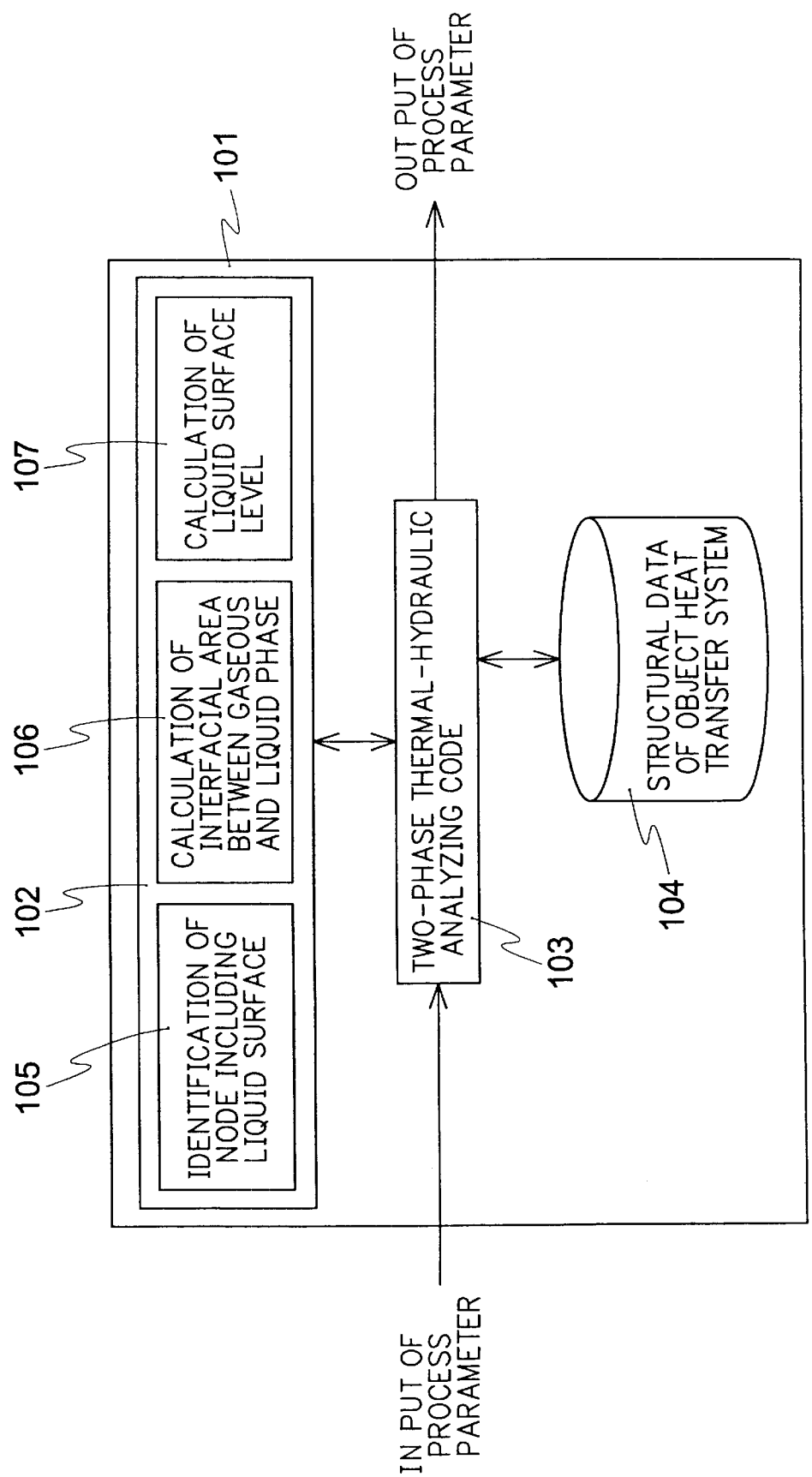
FIG. 1 is a block diagram showing a two-phase heat-flow analyzing system including a subject model incorporating a two-phase liquid-surface evaluation device according to the present invention.

FIG. 1 is a block diagram showing an analyzing model to which a two-phase liquid-surface evaluation device related to embodiment 1 of the present invention is incorporated. In this Figure, reference numeral 101 is an analyzing model to which a two-phase liquid-surface evaluation device is incorporated. Reference numeral 102 is the two-phase liquid-surface evaluation device. Reference numeral 103 is a two-phase flow (thermal-hydraulic) analyzing code that is generally used. Reference numeral 104 is analysis-target construction data which is a construction data for a specific target used for simulating the specific target by using the two-phase flow analyzing code. Reference numeral 105 represents a portion for finding a node of a liquid surface (volume regions belonging to a liquid surface) in the two-phase liquid-surface evaluation device. Reference numeral 106 represents a portion for finding the gas-liquid interfacial area of the liquid surface node in the two-phase liquid-surface evaluation device. Reference numeral 107 is a portion for finding the water level in the two-phase liquid-surface evaluation device.

Next, an explanation will be given of operations. Basically, calculations are carried out by using the analysis-target construction data and the two-phase flow analyzing code, based upon heat-flow condition process values between the analysis-target equipment and other equipment connected thereto. Here, in the case when any container which may possess a liquid surface exists within the analyzing model, a judgement is made by the two-phase liquid-surface evaluation device 102 so as to find a node possessing a liquid surface, the gas-liquid interfacial area of the liquid surface node is found, the height of the liquid surface is found, and the results of the calculations are reflected to the operation of a two-phase heat-flow analysis.

Figure 2:
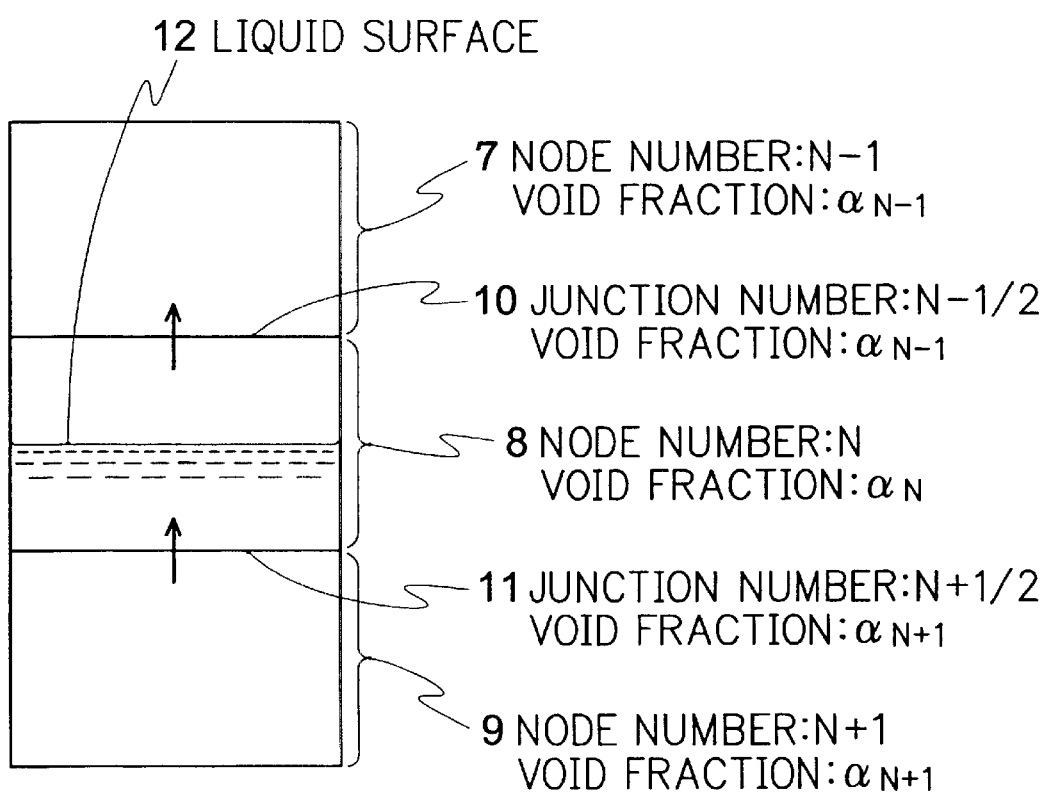
FIG. 2 is an illustrative drawing showing a node and passage denotation in a model of a heat-transporting equipment subject to the two-phase liquid-surface evaluation according to the present invention.

FIG. 2 shows a simulation using three volume regions (which are referred to as nodes) in the vicinity of a liquid surface of a container possessing the liquid surface which is a target for evaluation by the two-phase heat-flow analyzing method and the apparatus thereof in accordance with embodiment 1 of the present invention.

In FIG. 2, reference numeral 7 denotes an upper node, reference numeral 8 denotes a surface node, reference numeral 9 denotes a lower node, reference numeral 10 denotes a junction (passage) between 7 and 8, and reference numeral 11 denotes a junction between 8 and 9. An arrow on the junction 10 or 11 shows a flow direction which is taken to be positive in the calculation.

Figure 3A:
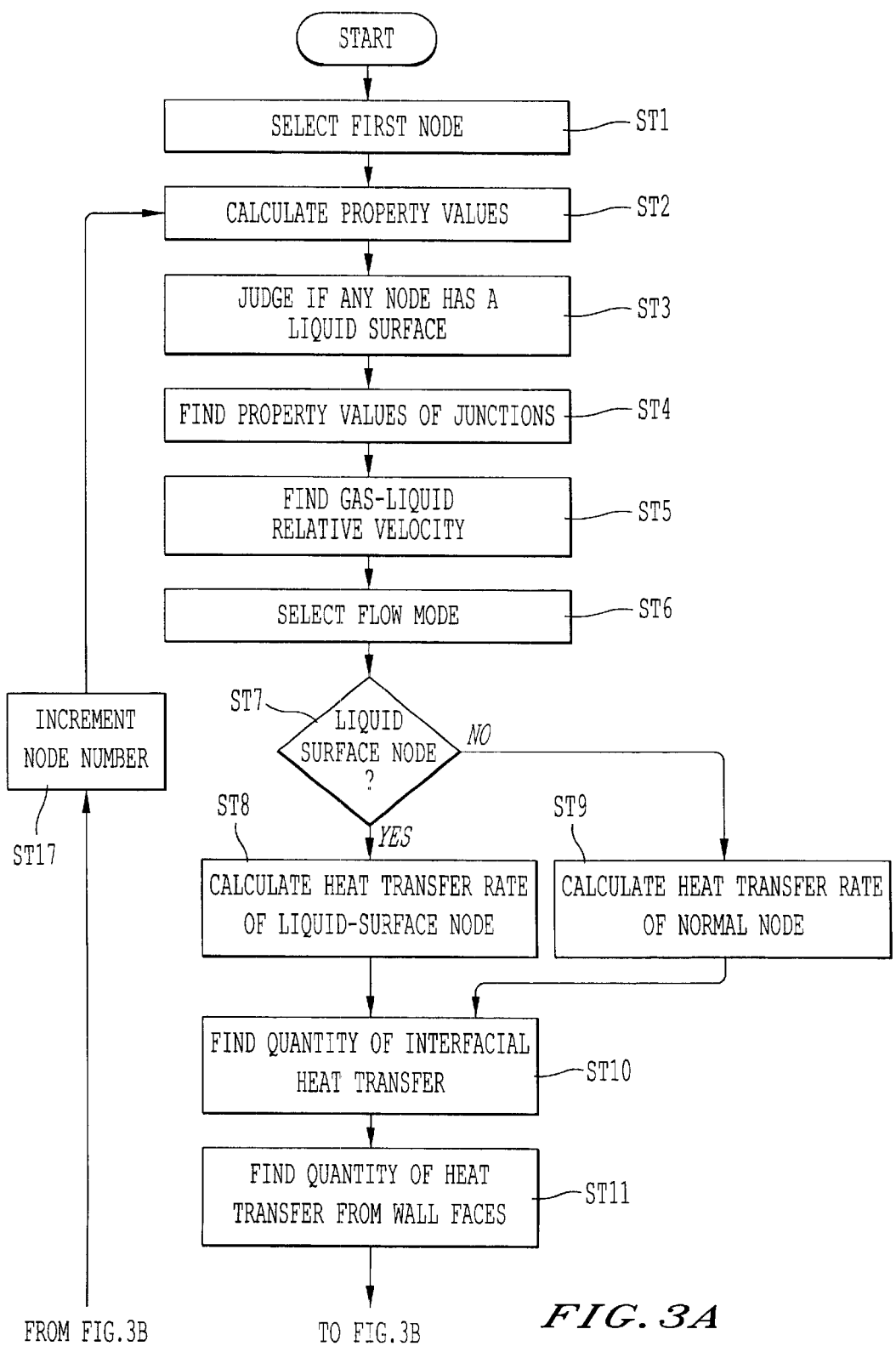
FIG. 3 is a flow-chart showing a calculation procedure of the two-phase heat-flow analyzing method according to the present invention.
Figure 3B:
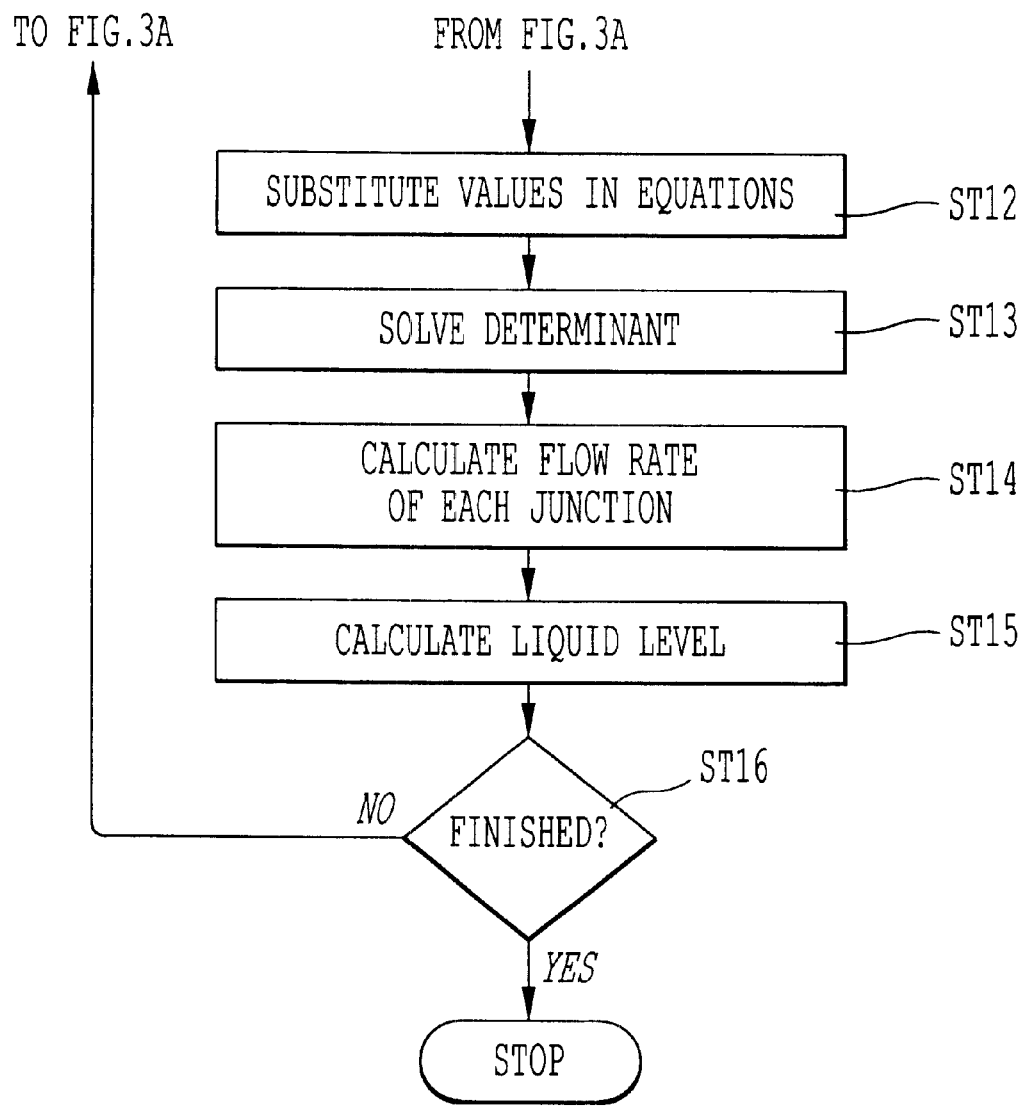

FIG. 3 is a flow chart that describes an algorithm used when a heat-flow analysis is carried out by the gas-liquid two-phase heat-flow analyzing apparatus to which the two-phase liquid-surface evaluation device of the present invention is incorporated. Among processes of the two-phase liquid-surface evaluation device, an algorithm characterized by the present invention is given by ST3, ST4, ST8 and ST15 in the algorithm shown in FIG. 3, and the other steps are conventional generally-used heat-flow analyzing functions.

The following description will discuss the flow chart shown in FIG. 3 in detail. First, at step ST1, an analysis is started with node number 1. At step ST2, property values of the respective nodes are calculated as preprocessing of calculations. Next, at step ST3, a judgement is made as to whether or not there is any node possessing a liquid surface. Then, at step ST4, property values of junctions connecting to the node in question are found. At step ST5, a gas-liquid relative velocity that is a relative velocity between the gaseous phase and the liquid phase is found. In this embodiment, the drift-flux model, which represents the velocity difference between the gaseous phase and the liquid phase by using the concept of the gas-liquid relative velocity, is adopted in the gas-liquid two-phase heat-flow analysis; therefore, this step is required. Next, at step ST6, selection of the flow mode is carried out. Upon carrying out an analysis on the heat-flow state of a fluid, it is necessary to selectively use various experimental equations depending on the differences in the flow states in the fluid; thus, a judgement on the flow state of the fluid is carried out at this step. Next, at step ST7, selection is made on the calculation method depending on whether or not the node in question is a liquid-surface node containing a liquid surface, and if it is a liquid-surface node, the sequence proceeds to step 8, while if it is not a liquid-surface node, the sequence proceeds to step 9. At step 8, the gas-liquid interfacial heat transfer rate of the liquid-surface node is calculated, and at Step 9, the gas-liquid interfacial heat transfer rate of the general (normal) node (gaseous phase only or liquid phase only) that has no liquid surface is carried out. Since, in a fluid possessing a gaseous phase and a liquid phase, heat transfer between the gaseous phase and the liquid phase takes place on the interface between the gaseous phase and the liquid phase, the interfacial heat transfer rate is found at this step. Next, at step ST10, based upon the gas-liquid interfacial heat transfer rate previously found and the temperature difference between the gas and the liquid, the quantity of gas-liquid interfacial heat transfer in the node in question is found. Next, at step 11, the quantity of heat transfer from wall faces contacting the node to the fluid inside the node is found. Then, at step ST12, various factors, such as the quantity of heat transfer between the gas and liquid, the quantity of heat transfer from the wall faces and the various property values, which have already been found, are substituted in various equations that hold between the gas and liquid; thus, a determinant is obtained. Next, at step ST13, the determinant is solved, thereby obtaining the pressure, the enthalpy, and the void fraction of each node. Then, at step ST14, the flow rate of each junction is calculated. Next, at step ST15, the liquid level is calculated while voids existing below the liquid surface are also taken into consideration. Then, at step ST16, a judgement is made as to whether or not node numbers which have been subjected to operations in this loop has reached the last node number (I=IEND), and if it is the last node, the operations are complete at this time step, while if it is not the last node, the node number is incremented by one at step ST17, and operations are carried out on the node having the next node number.

Next, referring to a flow chart shown in FIG. 4, an explanation will be given on the judgement process on the liquid-surface node at step ST3 in detail. First, at step ST18, the void fraction of the node possessing a liquid surface is substituted in variable α, the void fraction of the node connecting to the upper portion of the liquid-surface node is substituted in variable $\alpha_{up}$, and the void fraction of the node connecting the lower portion of the liquid-surface node is substituted in variable $\alpha_{down}$. However, if $\alpha_{down}$ is not less than 0.995, $\alpha_{down}$ is set to be 0.995. Next, at step ST19, taking into consideration the contribution rate in the case when the gaseous phase exists below the liquid surface as bubbles, evaluation is made on the case in which the liquid surface has reached the node top even if the void fraction is high. At ST19, if the judgement is made that the liquid surface has reached the node top, the sequence proceeds to step ST27, the liquid-level node is shifted to an upper node by one. Steps from ST20 to ST26 show processes in which the switchover between liquid-surface nodes is indicated while the void fractions of a liquid level connecting to the upper lower nodes are taken into consideration. At step ST20, if the void fraction of the node in question is zero, the sequence proceeds to step ST2 1, if the void fraction of the upper node is smaller than 1.0, the liquid-surface node is shifted to an upper node by one, and if the void fraction of the upper node is 1.0, the liquid node is left as it is. At ST20, if the void fraction is greater than 0.0, the sequence proceeds to ST22. At step ST22, if the void fraction of the node in question is 1.0, the liquid-surface node is shifted to a lower node by one, and if the void fraction is not 1.0, the sequence proceeds to step ST23. At step ST23, if the void fraction of the node in question is greater than 0.995, the sequence proceeds to step ST24, if the void fraction of the lower node is greater than 0.005, the liquid-surface node is shifted to a lower node by one, and if it is smaller than this value, the liquid-surface node is left as it is. At step 23, if the void fraction of the node in question is smaller than 0.995, the sequence proceeds to step ST25. At step ST25, if the void fraction of the node in question is smaller than 0.005 at step ST25, the sequence proceeds to step ST26, if the void fraction of the upper node is smaller than 0.995, the liquid-surface node is shifted to an upper node by one, and if it is greater than this value, the liquid-surface node is left as it is. Here, steps from ST23 to ST26 are provided so as to carry out the switchover between liquid-surface nodes smoothly.

Referring to FIG. 2, the following description will discuss the inner processes of ST4 of FIG. 3 in detail. First, if the node in question is not a liquid-level node, the property values of each junction are defined as the same as those of the node on the upstream side of the flow. Here, values, found as the property values of each junction are the void fraction and the density and various shifted terms. Additionally, if the void fraction is determined, the density can be univocally determined as a property value of the fluid from the pressure and the temperature at that time.

Next, in the case of the liquid-surface node, the void fraction of each passage is found in the following process.
With respect to the passage between the node to which the liquid surface belongs and a node located on the upper side of the node, the void fraction of the upper-side node is applied thereto.
With respect to the passage between the node to which the liquid surface belongs and a node located on the lower side of the node, the void fraction of the lower-side node is applied thereto.

Therefore, the void fraction of 10 is defined as $\alpha_{N-1}$, and the void fraction of 11 is defined as $\alpha_{N+1}$. Moreover, the mixed densities of fluids flowing through the passages 10 and 11 are defined as the same as the mixed densities of 7 and 9.

Next, the following description will discuss the calculations on the gas-liquid interfacial heat transfer rate of the liquid-surface node at ST8 of FIG. 3 in detail. First, in general, in a state where a liquid surface exists, heat and mass transfer on the interface between a gaseous phase and a liquid phase takes place only on the liquid-surface portion; in contrast, in a mixed state of a gas and a liquid, heat and mass transfer also takes place on the surfaces of bubbles or droplets.

However, in the case when, in a state where a liquid surface exists, bubbles are contained below the liquid surface, more consideration has to be given. For example, at the time of depressurized boiling, a large number of voids (bubbles) are generated below the liquid surface, and in this case, if evaluation is made by regarding the gas-liquid interfacial area of the liquid-surface node as the area of the liquid surface in the same manner as the state where no void exists below the liquid surface, the gas-liquid interfacial area comes to abruptly vary when the liquid surface shifts between nodes, and drastic boiling and condensation occur at this time, making the analysis unstable.

In the case of no void below the liquid surface, the gas-liquid interfacial area is represented only by the area of the liquid surface; however, in the case of voids below the liquid surface, the gas-liquid interfacial area is represented by the sum of the area of the void surfaces and the area of the liquid surface, and in most cases, the areas of the void surfaces is predominant. Therefore, void fractions are classified into those derived from the voids below the liquid surface and those derived from the gaseous phase above the liquid surface, and found as described below. First, the void fraction of the liquid-surface node is the sum of a void fraction contribution $\alpha_{0g}$ derived from the gaseous phase above the liquid surface of the liquid-surface node and a void fraction contribution $\alpha_{01}$ derived from the void below the liquid surface; therefore, the following equations are satisfied:

$$\alpha_0 = \alpha_{0g} + \alpha_{01} \quad (1)$$

Next, supposing that the contribution $\alpha_{01}$ of the liquid phase below the liquid surface contains voids at the same ratio as the node below the liquid-surface node, the following equation is satisfied.

$$\alpha_{01} = (1 - \alpha_{0g}) \cdot \alpha_1 \quad (2)$$

Here, $\alpha_{0g}$ and $\alpha_{01}$ are represented as follows based upon equations (1) and (2):

$$\alpha_{01} = \alpha_1 \left( \frac{1 - \alpha_0}{1 - \alpha_1} \right) \quad (3)$$

$$\alpha_{0g} = 1 - \frac{1 - \alpha_0}{1 - \alpha_1} \quad (4)$$

where
$\alpha_{0g}$: void fraction contribution derived from the gaseous phase above the liquid surface of the liquid-surface node,
$\alpha_{01}$: void fraction contribution derived from the gaseous phase below the liquid surface of the liquid-surface node,
$\alpha_0$: void fraction of the liquid-surface node as a whole, and
$\alpha_1$: void fraction of a node below the liquid-surface node.

As described above, the gaseous-phase volume fraction $\alpha_{0g}$ and the void fraction $\alpha_{01}$ below the liquid surface in a target node are found from the void fractions of the target node and its lower node by one. The void surface area below the liquid surface is found from 60 $_{01}$ and the diameter of bubbles, and the gas-liquid interfacial area of the liquid-surface node is found as the sum of the liquid surface area and the void surface area below the liquid surface.

Next, an explanation will be given of the liquid-level evaluation at ST15 of FIG. 3 in detail. First, since the liquid-surface node is found by ST3, the liquid level is represented by a value obtained by adding the liquid-surface height inside the liquid-surface node to the lower end of the liquid-surface node. The liquid-surface height inside the liquid-surface node is found by the following equation (5). Here, h represents the height of the entire liquid-surface node.

$$h \cdot (1 - \alpha_{og}) \quad (5)$$

Figure 4:
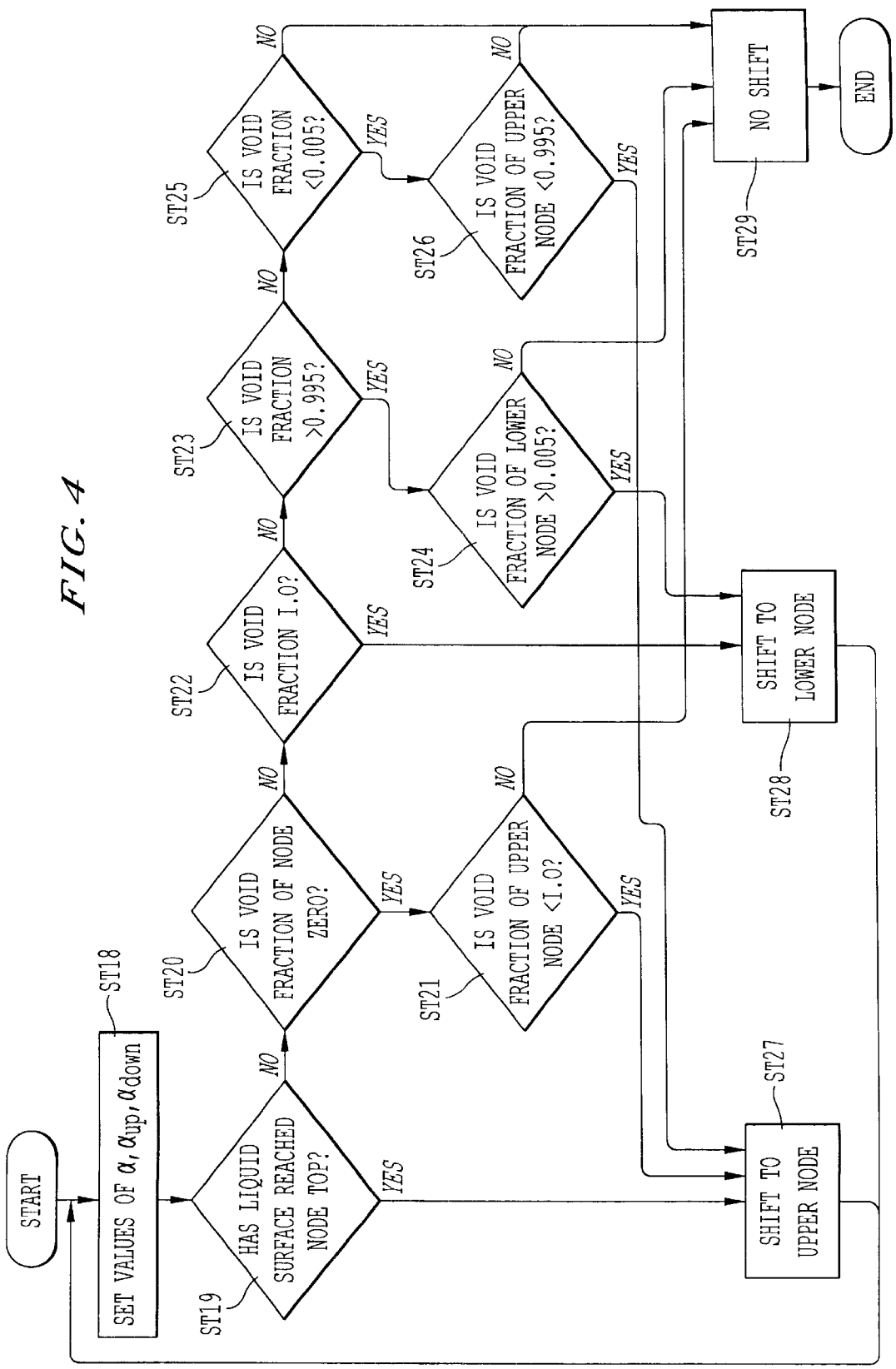
FIG. 4 is a detailed flow chart showing a part of FIG. 4.

One of judgement methods for the node possessing a liquid surface is shown in FIG. 4; however, it is possible to make a judgement by using operation values of equations (1) through (4). In this case, the fact that, if the node in question is a liquid-surface node, the gaseous-phase volume fraction $\alpha_{og}$ takes an intermediate value between 0 and 1 is utilized. However, there is a possibility that a plurality nodes whose $\alpha_{og}$ show intermediate values between 0 and 1 are successively found, thereby making the judgement difficult. In order to make an appropriate judgement by avoiding this difficulty, the range of $\alpha_{og}$ is preferably set, for example, at 0.1 to 0.9 as its judgement condition by taking the calculation precision into consideration. Moreover, among a plurality of liquid-surface node solutions, the one whose $\alpha_{og}$ is closest to the center value (for example, 0.5) may be selected.

Figure 5:
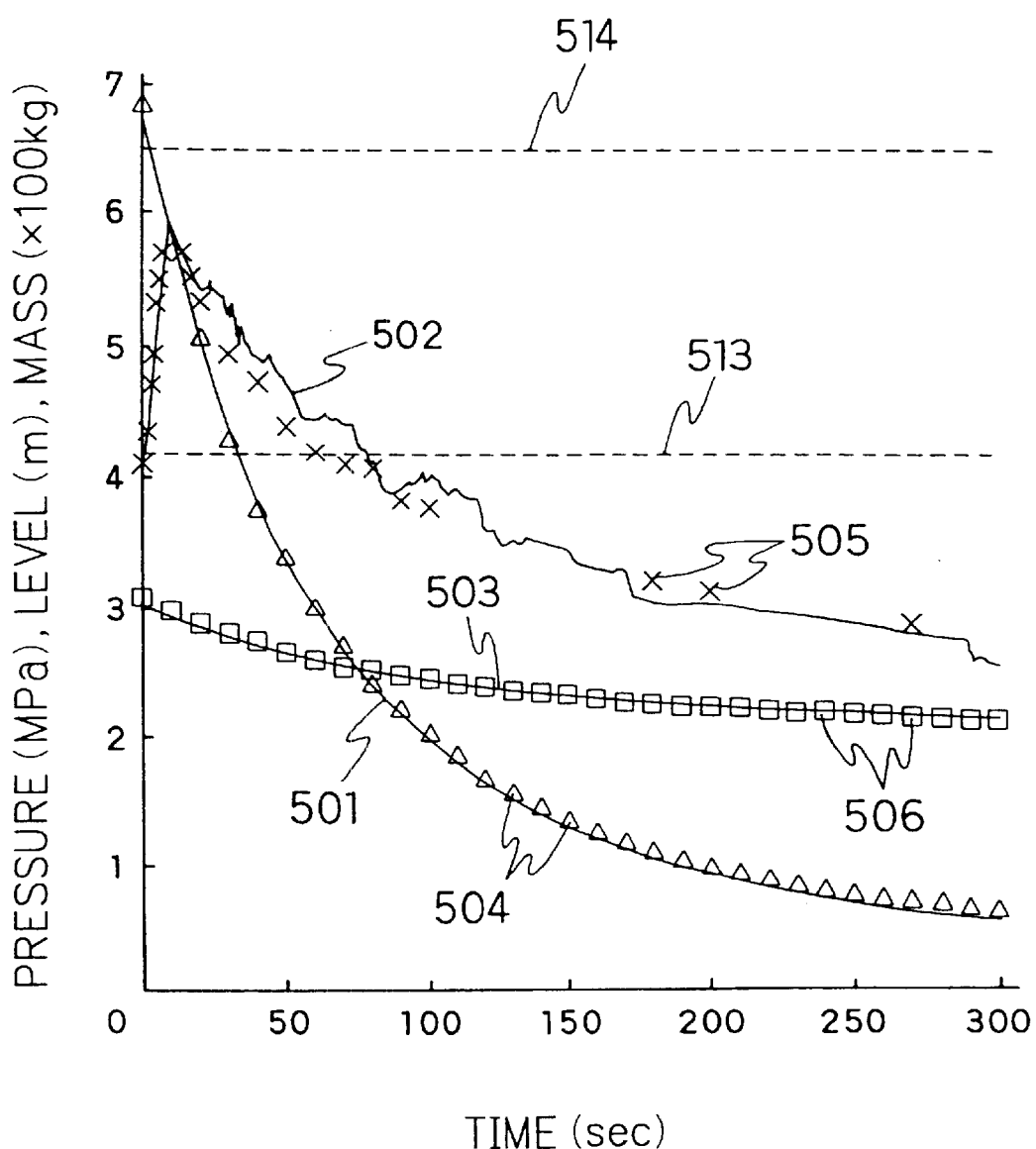
FIGS. 5 and 6 are diagrams showing the results of a blowdown experiment of top breakage case and a heat-flow analysis according to the present invention on the same experiment.
Figure 6:
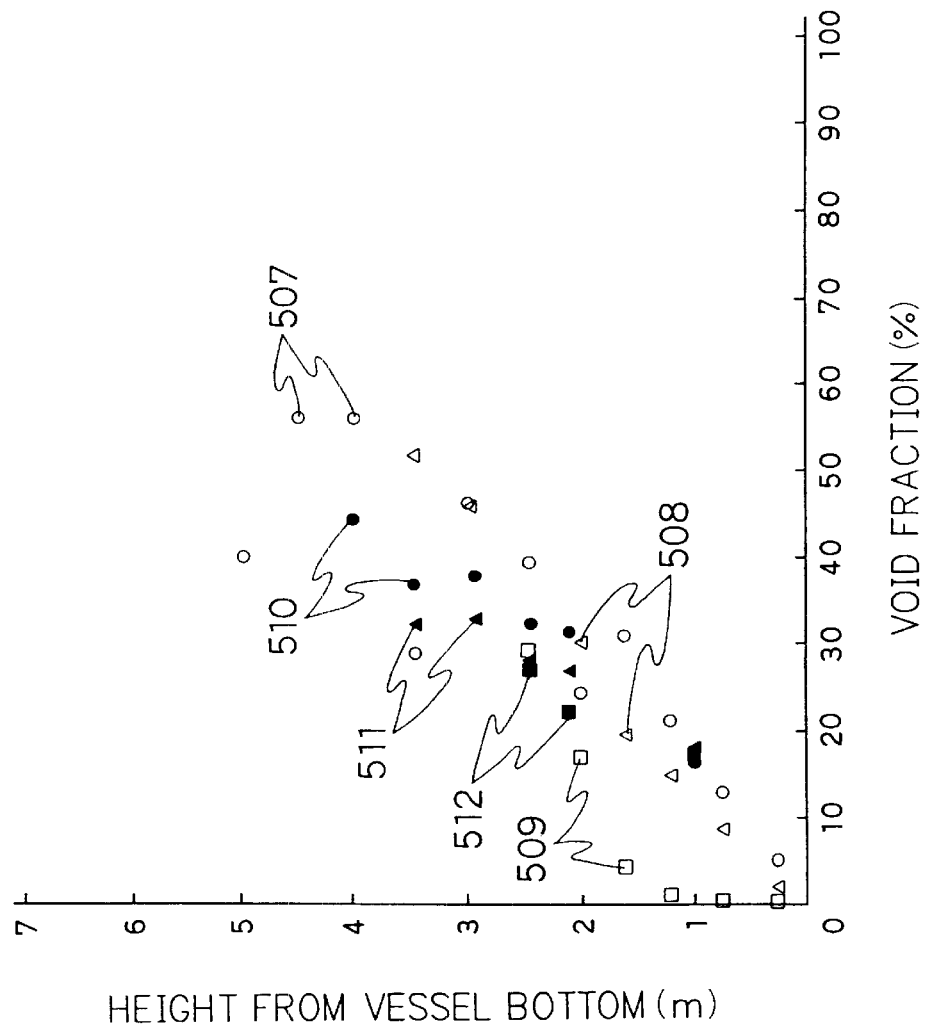

FIGS. 5 and 6 show a result of a simulation test of the calculation method of the present invention demonstrating as to how closely the calculation of the invention can simulate a result of an actually conducted blow-down experiment by Kagawa et al described in (Journal of Japan Nuclear Society, 20, No. 6,64 (1978)). An initial state of the experiment was taken in which a tank encloses water and vaper in a saturated state having a water surface therein. The blow-down experiments were conducted for two cases, by rupturing an upper portion of the tank, and rupturing a lower portion as well.

Introduction

Safety analysis of higher reliability is a work of great importance to perform safety assessment for a nuclear reactor more correctly. Therefore, most effort in recent safety analysis are directed toward proper estimation of phenomena under a postulated accident.

In order to perform such a proper estimation, an approach could be taken in which accuracy of every analytical model for various phenomena predicted under an accident of pipe rupture in a light-water reactor are enhanced and integrated in order to improve the accuracy of estimation for whole analysis code.

Especially for blowdown in a light-water reactor caused by an accident of pipe rupture, behavior of fluid, transit of two-phase liquid level and void distribution inside a vessel are important phenomena having great effect on cooling of a reactor core.

However, these phenomena are roughly treated in the conventional analytical models. In RELAP-4, for example, void distribution within a node is to be input as a linear distribution. In the experiments exploring the blowdown, moreover, variations of the two-phase liquid level and that of the void distribution with the lapse of time are scarcely measured.

In the present report, A model "LEVELY" is developed to perform detail analysis of fluid behavior in a pressure vessel during the blowdown. Moreover, the two-phase liquid level and the void distribution are experimentally measured to verify this model.

Experiment

Figure 12:
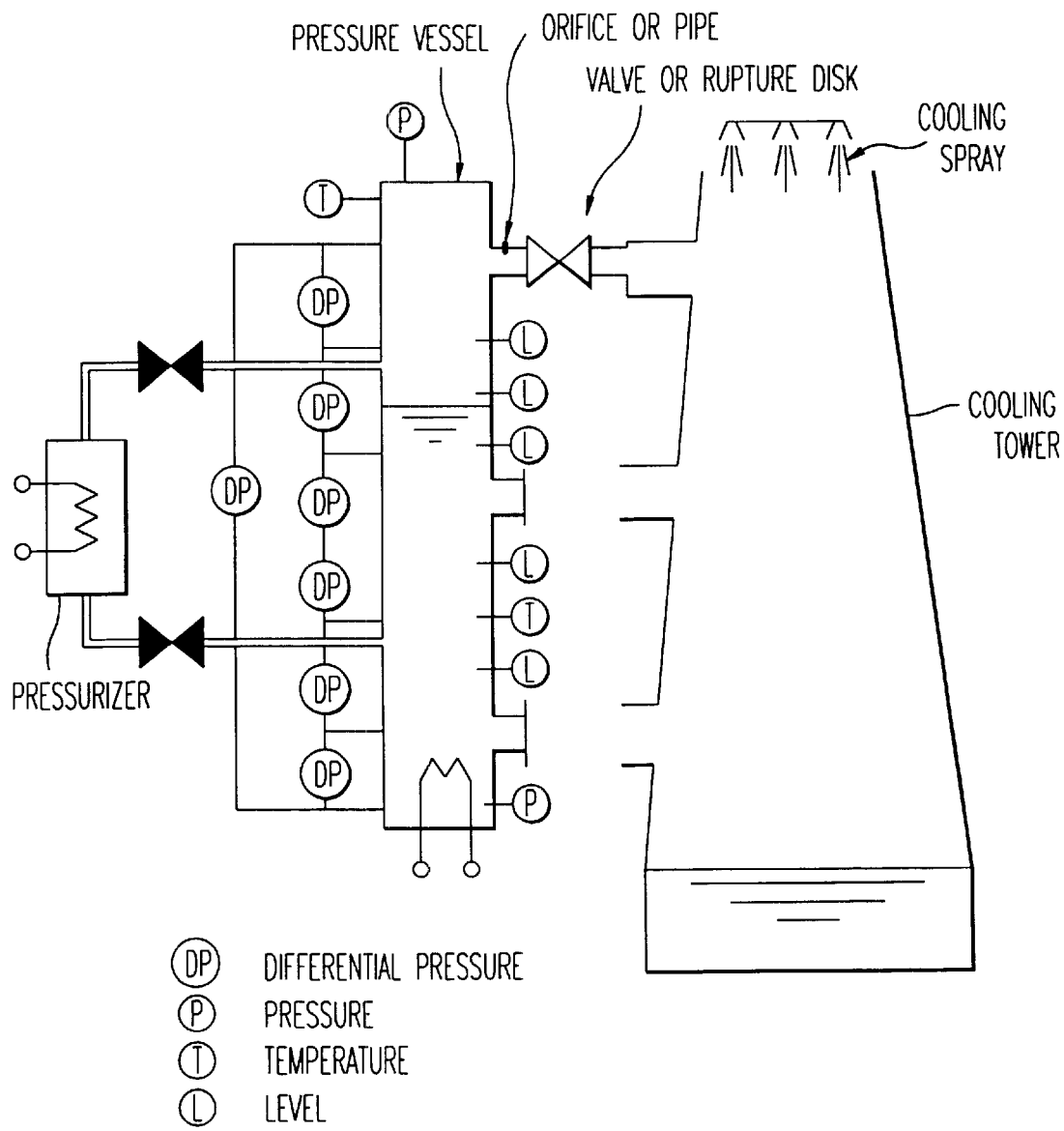
FIG. 12 is a schematic diagram of test facilities according to the background art.
Figure 17:
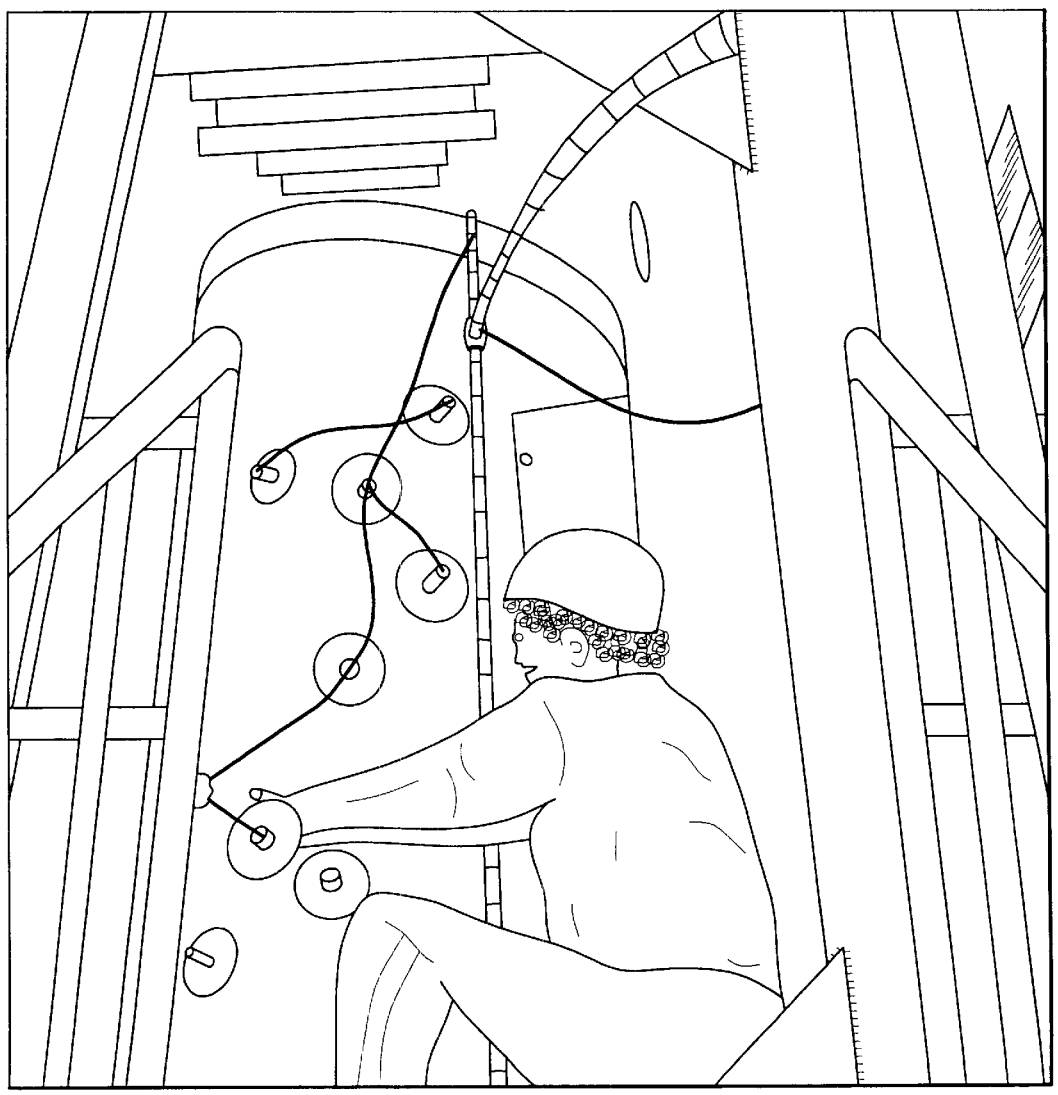
FIG. 17 is a photograph of test facilities according to the background art.

In FIG. 12 and FIG. 17, the test facilities for present experiment is shown. The pressure vessel is a cylinder having a diameter of 36.4 mm and height of 7.015 mm (volume of 730 liter). An electric heater 100 kW is equipped therein to heat water in the pressure vessel, in order to attain prescribed initial pressure. A pressurizer having a heater of 40 kW is connected to the pressure vessel in order to attain required initial saturation. The pressure vessel is covered with heat insulating material.

To simulate a pipe rupture, nozzles having an inner diameter of 97 mm and length of 419 mm are provided in the upper, middle and lower part of the pressure vessel respectively. An orifice or pipe having a diameter of 5 to 30 mm is inserted into one of the nozzles, and a pneumatic valve or rupture disk following the orifice or pipe is opened instantaneously. The other nozzles are lidded to close. Discharged fluid is introduced into a cooling tower of ambient pressure and cooled within a spray of cooling water.

With a measuring system, liquid level (height of liquid surface), mass of residual fluid in the vessel and void distribution as well as the pressure and temperature in the vessel are measured. the liquid level-meter determines the level of the liquid based on difference in electric resistance between the liquid and vapor, and arranged to use within fluid of high temperature and high pressure. The residual mass and the void distribution are determined in such a manner that differential pressures are measured in the vertical direction and mass of the fluid is computed out by considering the difference in pressure thus measured mainly depends on gravity to the fluid. The measurements are considered to be appropriate except for the early stages of blowdown in which momentum of the fluid is greatly fluctuates. The flow rate of the discharged fluid is determined as a rate of decrease in the residual mass.

Result and Consideration

Typical examples of experimental result are shown in FIGS. 13 to 16(a), (b). In each of which, an initial pressure is 70 kg/cm$^2$ and a discharge is performed from a saturated state.

1. Discharge from the Upper Part of the Pressure Vessel

Figure 13A:
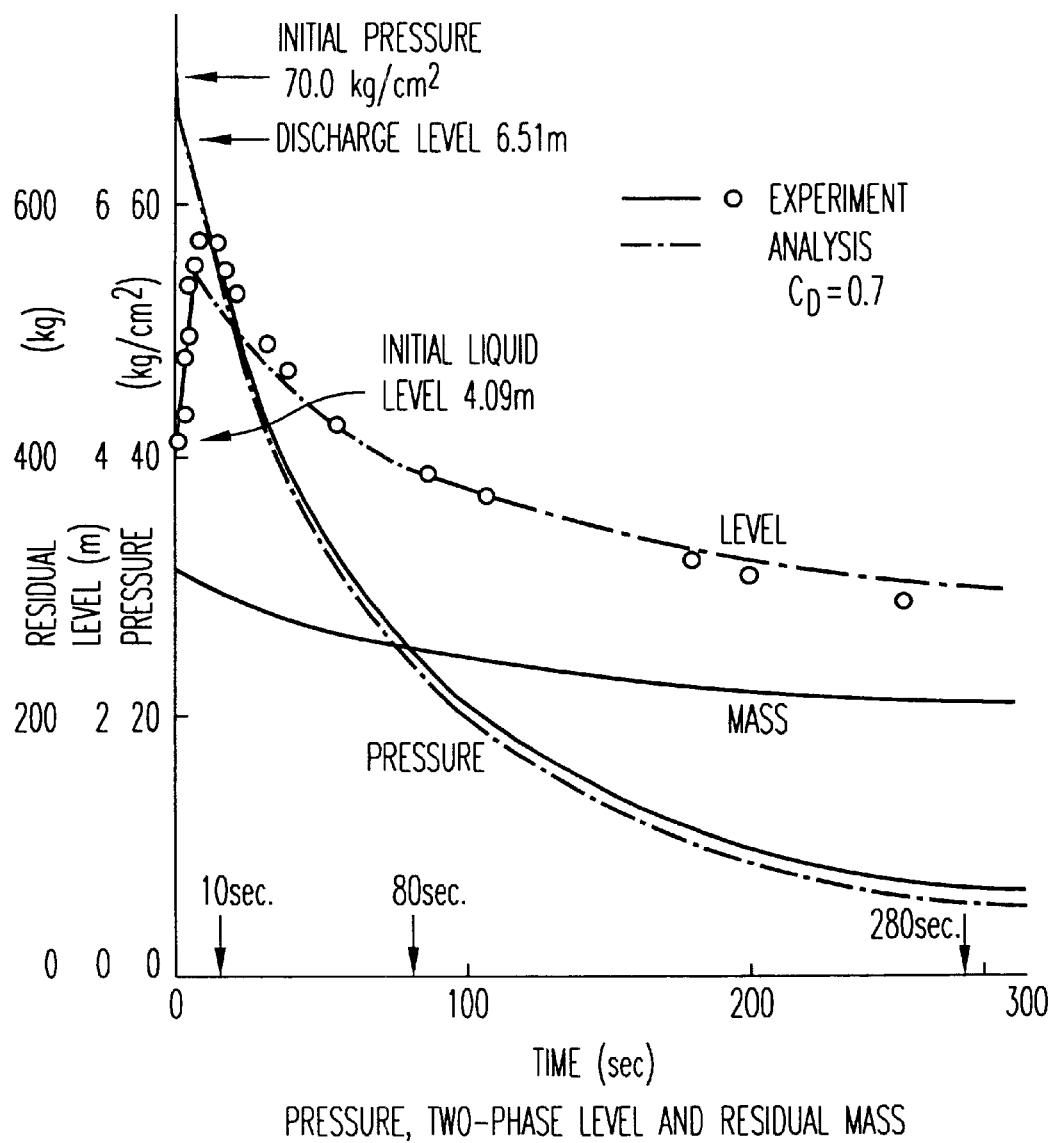
FIG. 13($a$) is a graph of top blowdown results showing pressure, two-phase level and residual mass according to the background art.

FIG. 13 shows a discharge from the upper part of the pressure vessel through an orifice having a diameter of 15 mm. FIG. 13(a) shows pressure, residual mass and two-phase liquid level with the lapse of time. In the analysis, as described above, the amount of discharging flow is adapted to the experimental result by coefficient $C_D$ a(coefficient for Moody's correlation equation). In the pressure example, both the pressure and the mass agree well with the experimental data when $C_D$=0.7. Variation in the two-phase liquid level is mainly depends on difference between the amount of void (bubbles) appears with decrease in pressure and the amount of void buoyantly leaves from the surface of the liquid. In addition, the variation in the two-phase liquid level is slightly affected by heat conduction through walls of the vessel and density of each phase varied with the pressure.

When the discharge begins, since generation of void is extremely high due to decrease in pressure, the level of the liquid is risen as shown in FIG. 13(a). As for the level of liquid, although difference between analysis and experiment is quite small, result of analysis shows lower liquid level around a lapse of 10 sec. The reason for this discrepancy is assumed that actual gas-liquid slip velocity is smaller than the analytical value which is determined based on rising speed of void within the liquid of steady-state, in condition that the liquid around the void is also risen up together with the void appears extremely through depressurized boiling.

Figure 13B:
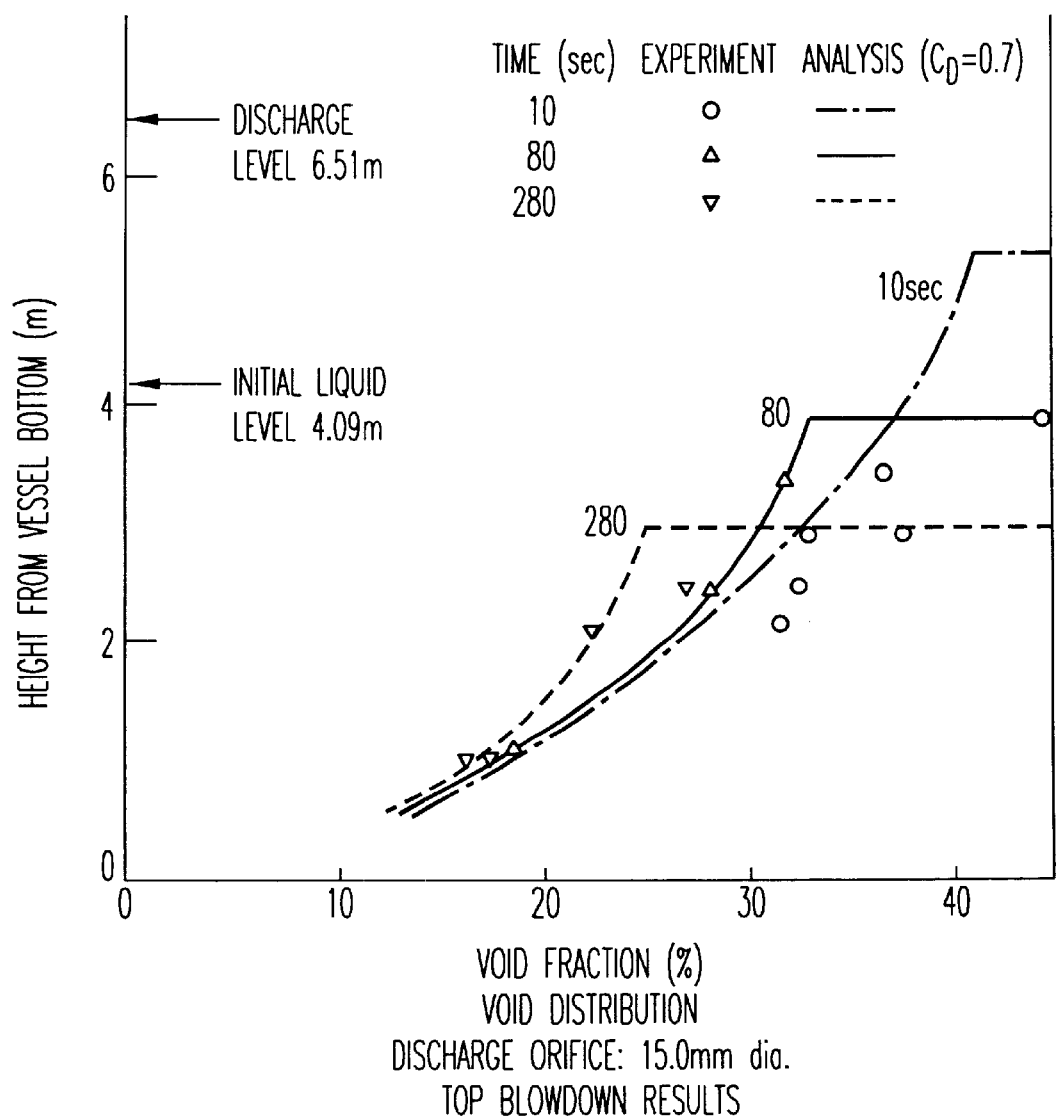

In FIG. 13(b), void distribution is shown for the same experiment. At the lapse of 10 sec, calculated void distribution is smaller than the experiment and consistent with the above analytical result for the liquid level.

2. Discharge from the Lower Part of the Pressure Vessel

Figure 14A:
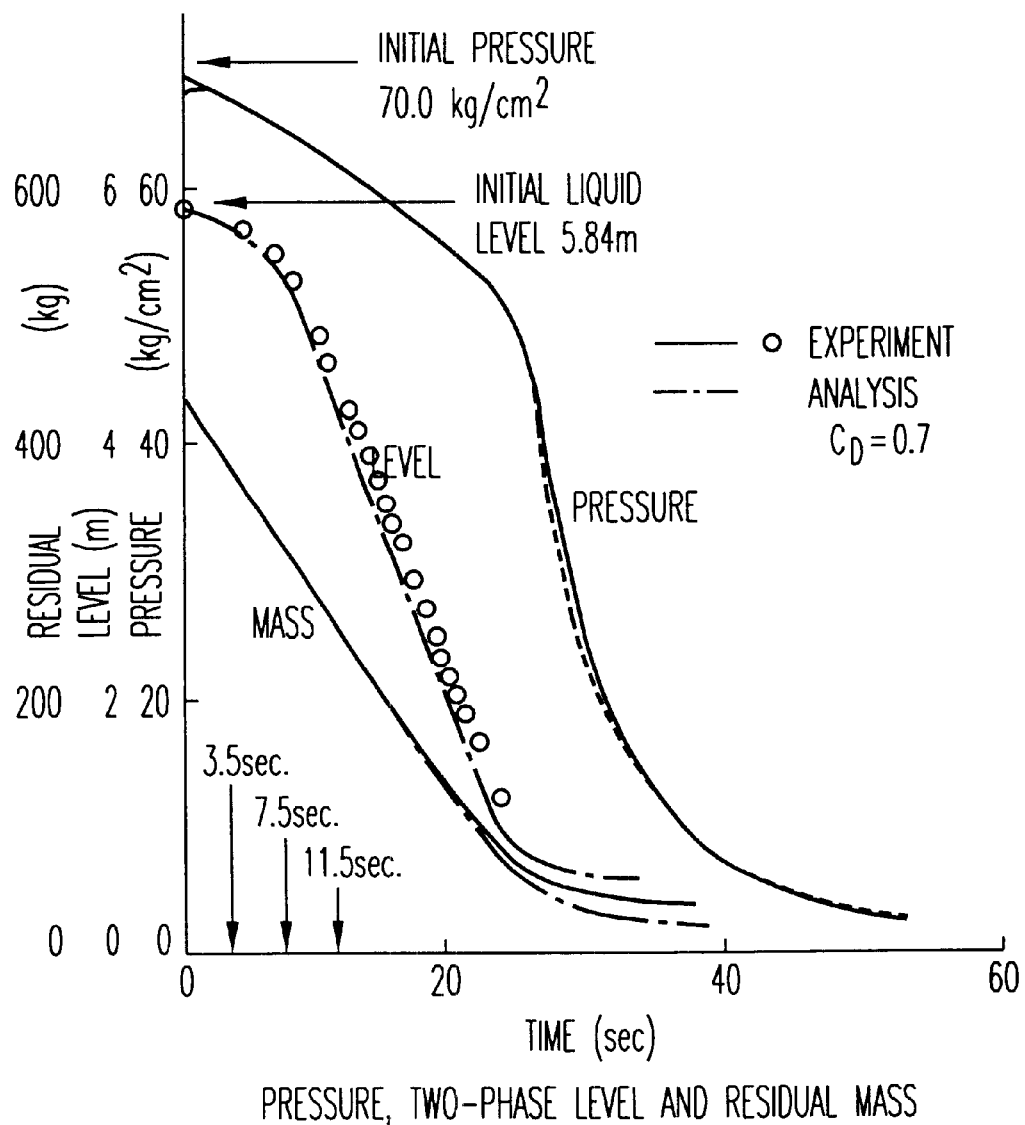
FIG. 14($a$) is a graph of bottom blowdown results showing pressure, two-phase level and residual mass according to the background art.

FIG. 14 shows an example of discharge from the lower part of the pressure vessel through a pipe having an inner diameter of 30.7 mm and length of 419 mm. Pressure and mass are adjusted with coefficient $C_D$ of 0.6 in analysis, and liquid level is accurately calculated in this case as shown in FIG. 14(a). In the discharge from the lower part, since liquid discharge or low quality discharge occurs in the beginning, pressure gently varies while mass flow rate is large. As shown in FIG. 14(b), however, void appears considerably. When the liquid level falls to the level of discharge outlet, vapor discharge dominates to increase volume flow late so that the pressure decreases rapidly. It is recognized that accurate calculation is attained through the whole discharge process.

3. Discharge from the Middle Part of the Pressure Vessel (1)

FIG. 15 shows a discharge from the middle part of the pressure vessel wherein an initial liquid level is higher than discharge level. Discharge is taken place through a pipe having an inner diameter of 10.1 mm and length of 419 mm. When the liquid level drops down to the discharge level, that is, liquid discharge or low quality discharge changes to vapor discharge or high quality discharge, decrease in pressure is accelerated and mass flow late is decelerated as shown in FIG. 15(a). Therefore, a drop of the liquid level slows down. With coefficient $C_D$=0.65, the result of analysis agree well with the experiment for whole discharge process.

Figure 15B:
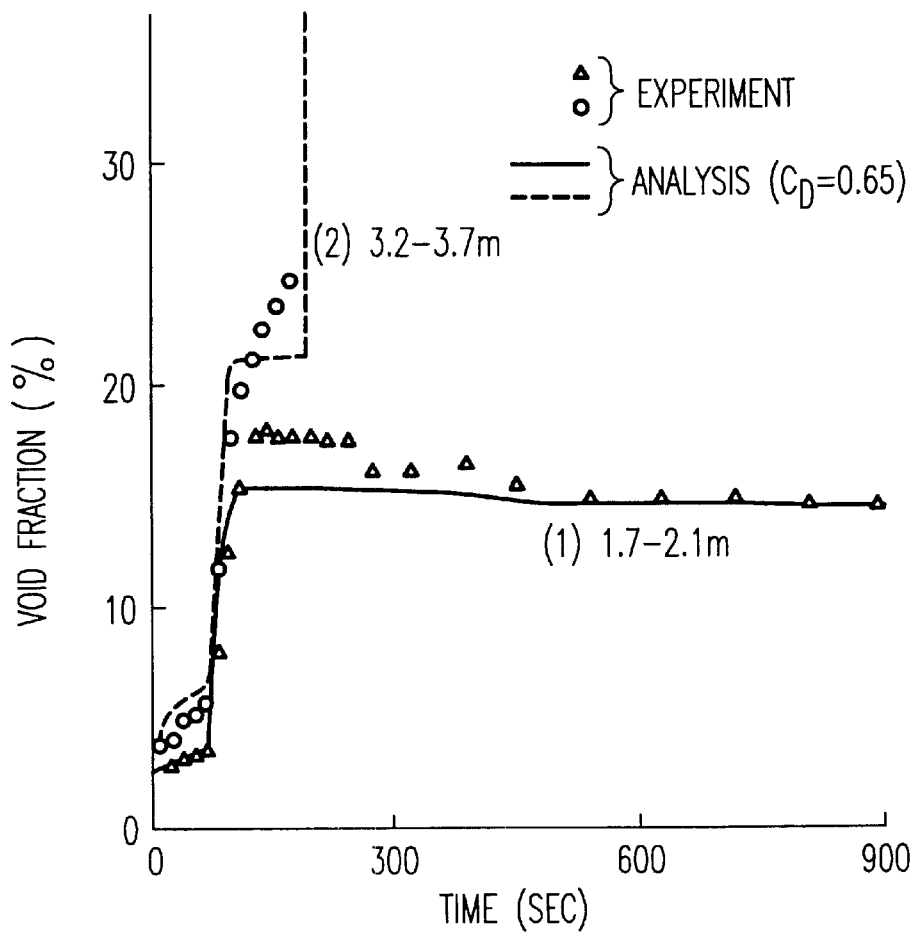
FIG. 15($a$) is a graph of intermediate blowdown results showing pressure, two-phase level and residual mass according to the background art.

FIG. 15(b) shows variations in void fraction at two fixed positions in the pressure vessel. Curved line (1) and (2) show averaged void fraction at the positions ranging from 1.7 to 2.1 m and 3.2 to 3.7 m, respectively. Although void appears immediately after beginning of discharge, void fraction stays around several percent for a while because of buoyancy of bubbles. When the liquid level drops to the discharge level at a lapse of about 25 sec (FIG. 15(a)), depressurization rapidly takes place so that void fraction rapidly increases. After a lapse of approximately 180 sec from the beginning of discharge, the liquid level drops to 3.7 m (FIG. 15(a)) so that void fraction of curved line (2) rapidly increases further. When the liquid level drops to 3.2 m, void fraction of curved line (2) reaches 100 percent. The measuring position for void fraction of curved line (1) lies below the liquid surface during a lapse of 900 sec, so that void fraction is almost constant after discharge has changed to vapor discharge. On the whole, the result of analysis agrees well with the experiment.

4. Discharge from the Middle Part of the Pressure Vessel (2)

Figure 16A:
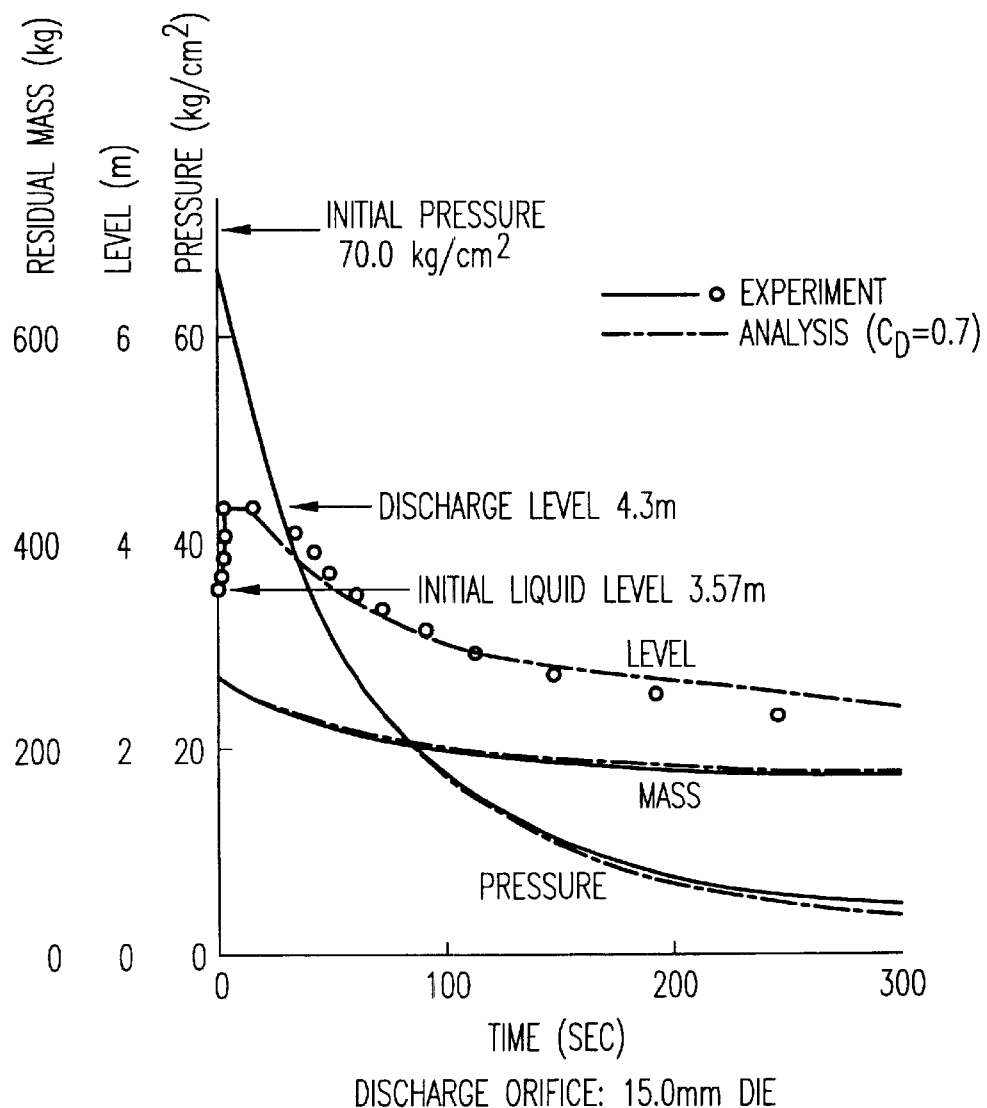
FIG. 16($a$) is a further graph of intermediate blowdown results showing pressure, two-phase level and residual mass according to the background art.

FIG. 16 shows a discharge from the middle part of the pressure vessel wherein an initial liquid level is lower than discharge level. Discharge is taken place through an orifice having a diameter of 15.0 mm in FIG. 16(a), and through a pipe having an inner diameter of 30.7 mm and length of 419 mm in FIG. 16(b). In these cases, similarly to the discharge from the upper part, the liquid level rises at the beginning due to the depressurized boiling. However, when the liquid level has reached the discharge level, it does not rise further and stagnates for a while, A two-phase discharge takes place in this situation, and the amount of discharge makes an equilibrium with the amount of generated void due to the depressurization. Supposing the liquid level rise, quality of discharging flow is lowered to decelerate the depressurization so that an effect of lowering the liquid level appears. Supposing the liquid level lowering, in contrast, an effect of raising the liquid level appears. Therefore, the liquid level stays around the discharge level in this end. While it is considered that the liquid surface might be wavily fluctuating around the discharge level, satisfactory result is obtained with simple one-dimensional analysis as shown in Figs. Thereafter, sufficient depressurization would not be given even with the vapor discharge, so that the liquid level falls due to the effect of bubbles leaving from the liquid surface. In the above cases, coefficients $C_D$ of 0.7 and 0.6 are respectively taken for analyses.

In FIG. 16(b), difference between analysis and experiment is somewhat large for residual mass after the liquid surface has reached to the discharge level. As a reason for this difference, it is considered that the amount of discharging flow might be underestimated for the case where the liquid surfaces lies around the discharging portion. For estimating the amount of discharging flow in the above case, the weighted mean enthalpy of a node having the discharging outlet, in which enthalpy above the liquid surface and that below the liquid surface are weighted and averaged, is employed. Therefore, the amount of discharging flow deeply depends on where the liquid surface lies. The diameter of the discharging port is 30.7 mm in this case, moreover, the flow greatly varies with the lapse of time. Accordingly, it is considered that the liquid level rising to the discharge level might not stop at the balanced level due to the inertia of two-phase fluid, so that the liquid level might overshoot the balanced level. In such case, more liquid is flowed out as compared with an analysis in which inertia (momentum) is not considered. In the experiments, however, liquid has not reached the liquid-level measuring probe placed 420 mm above the discharge level. In such case of extreme variation, furthermore, the gas-liquid slip velocity under unsteady transient state should be considered.

Typical examples are shown in the above for discharges from the upper, middle and lower part of the vessel, and each of which shows good agreement between experiment and analysis for a discharging outlet having a diameter ranging from 5 to 30 mm. According to a vapor discharging experiment with a discharging outlet having a diameter of 30 mm, the highest depressurizing rate is approximately 5 to 8 kg/cm² sec (although an extreme depressurization is temporarily observed immediately after beginning of blowdown due to thermal imbalance, such a condition is excluded from consideration in the present analysis). Assuming a LOCA in a BWR, meanwhile, a depressurizing rate is approximately 3 to 4 kg/cm² sec at maximum according to the analyzing system of conventional code. Therefore, according to the above experiments, it is realized that this code "LEVELY" is properly applicable to the analysis of heat-flow characteristics inside the pressure vessel, at least for BWR under LOCA.

First, an explanation will be given of the outline of the experiments. In these experiments, the state in which a liquid surface is formed inside a pressure container in a saturated state is taken as an initial state, and the tansient change at the time of rupturing each portion of the container is measured. The pressure, liquid level and void distribution at the time of rupturing one portion of a pressure container maintained at a pressure of 70 kg/cm² are measured, and the pressure container is provided as a cylinder having a diameter of 360 mm and a height of 7015 mm (730 liters in the inner volume).

Next, an explanation will be given of an analysis model for carrying out numerical analyses on the experiments. With respect to the node division, 15 divisions were made in the height direction. In such cases shown in these experiments, the amount of discharging flow forms a critical flow and can be found by using a critical flow model. As to whether or not the amount of the discharge flow rate is correctly found by using the critical flow model, confirmation was preliminarily made by making comparisons with the experimental values of the residual mass inside the tank.

FIG. 5 shows an example of the upper-portion rupture, in which FIG. 5 shows the pressure, the liquid level and the behaviors of the residual mass, and FIG. 6 shows the void distribution. In FIG. 5, reference numeral 501 shows the results of analyses on the pressure, 502 shows the results of analyses on the liquid level, 503 shows the results of analyses on the residual mass, 504 shows the experimental values of the pressure, 505 shows the experimental values of the liquid level, and 506 shows the experimental values of the residual mass. 513 shows the initial liquid level 4.09 m, and 514 shows the discharge level 6.51 m. In FIG. 6, reference numeral 507 shows the results of analyses on the void distribution in the height direction 10 seconds after the rupture, 508 shows the results of analyses on the void distribution in the height direction 80 seconds after the rupture, and 509 shows the results of analyses on the void distribution in the height direction 280 seconds after the rupture. Reference numeral 510 shows the experimental values of the void distribution in the height direction 10 second after the rupture, 511 shows the experimental values of the void distribution in the height direction 80 seconds after the rupture, and 512 shows the experimental values of the void distribution in the height direction 280 seconds after the rupture.

The change in the two-phase liquid level is mainly found from the difference between the amount of voids generated by a depressed pressure and the amount of voids that rise and leave from the liquid surface. Immediately after the start of discharging, the void generation, in particular, due to the depressed pressure takes place abruptly, thereby causing an abrupt rise in the liquid level. As the pressure reduces, the amount of discharge also reduces so that the amount of vapor rising above the water surface from the water exceeds the amount of vapor generation below the water surface, thereby allowing the water level to reduce gradually. With respect to the water level change, even if it is a phenomenon in which a large quantity of voids exist below the water surface, a smooth transition was made as a whole although fluctuations in the water level ranging from 10 cm to 20 cm were seen, and close match to the experimental values was obtained; therefore, it can be said that the two-phase liquid-surface evaluation was carried out desirably by the incorporation of the two-phase liquid-surface evaluation device of the present invention.

Figure 7:
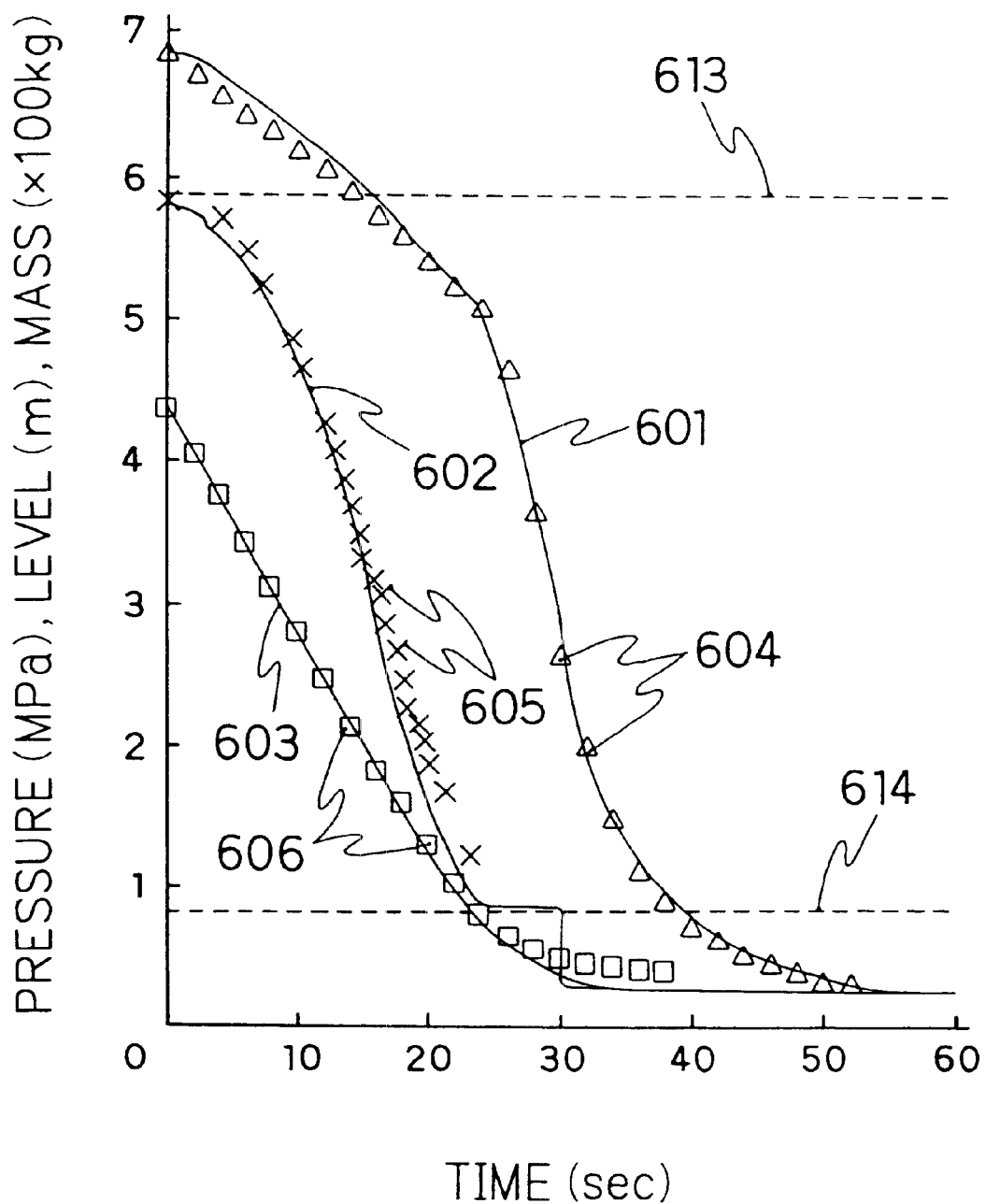
FIGS. 7 and 8 are diagrams showing the results of a blowdown experiment of bottom breakage case and a heat-flow analysis according to the present invention on the same experiment.
Figure 8:
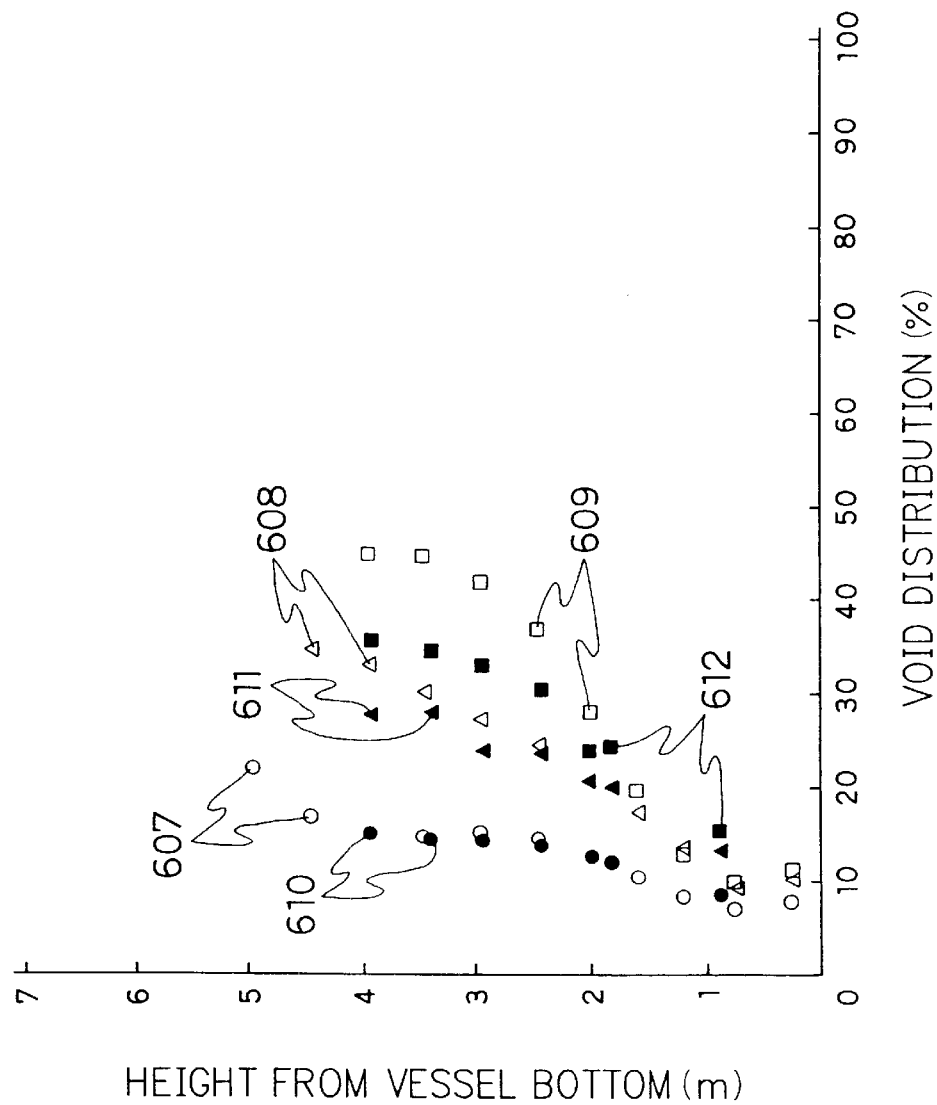

FIG. 6 shows an example of the lower-portion discharge, in which FIG. 7 shows the pressure, the liquid level and the behaviors of the residual mass, and FIG. 8 shows the void distribution. In FIG. 7, reference numeral 601 shows the results of analyses on the pressure, 602 shows the results of analyses on the liquid level, 603 shows the results of analyses on the residual mass, 604 shows the experimental values of the pressure, 605 shows the experimental values of the liquid level, and 606 shows the experimental values of the residual mass. 613 shows the initial liquid level 5.84 m, and 614 shows the discharge level 0.8 m. In FIG. 8, reference numeral 607 shows the results of analyses on the void distribution in the height direction 3.5 seconds after the rupture, 608 shows the results of analyses on the void distribution in the height direction 7.5 seconds after the rupture, and 609 shows the results of analyses on the void distribution in the height direction 11.5 seconds after the rupture. Reference numeral 610 shows the experimental values of the void distribution in the height direction 3.5 second after the rupture, 611 shows the experimental values of the void distribution in the height direction 7.5 seconds after the rupture, and 612 shows the experimental values of the void distribution in the height direction 11.5 seconds after the rupture.

In the lower-portion discharging, a liquid-phase discharge is initially made, with the result that the mass flow rate is great; however, since the pressure is supported by evaporation of the liquid phase, a pressure drop takes place in a relatively gradual manner. When the water level has reached the outlet, a transition occurs to a gaseous-phase discharge, the volume flow rate increases, and a pressure drop occurs abruptly. The results of the analyses closely match the experimental results in all the pressure regions, and the pressure drops to virtually atmospheric pressure 60 seconds later. With respect to the void distribution, the error is maintained within 10% even at maximum; therefore, taking account of the measuring precision of the void fraction, it is considered that calculations were carried out with high precision.

In any of the cases, the behaviors of the liquid surface and the void fraction below the liquid surface were correctly found relatively so that the effectiveness of the two-phase liquid-surface evaluation device has been confirmed. In the case of no application of this two-phase liquid-phase evaluation device, in any of the cases, it was not possible to correctly find the behaviors of the liquid surface unless a judgement process for a liquid-surface node was carried out. In other words, since the void fraction below the liquid surface is quite high, it is not possible to predict where a liquid surface is located. Moreover, in any of the cases, at the time of a switchover between liquid-level nodes, the gas-liquid interfacial area changes abruptly, causing the operation to be diverged upon switching the liquid-level nodes, unless a process for calculating the gas-liquid interfacial heat transfer rate of the liquid-surface nodes is provided.

As described above, the present invention provides effects by which, in the case when a large quantity of gaseous phase exists below a liquid surface, the node possessing the liquid surface is properly estimated. Moreover, by properly estimating the ratio of existence of bubbles below the liquid surface and a gaseous phase above the liquid surface, it is possible to properly calculate the heat and mass transfer area between the gaseous phase and the liquid phase, with the result that it becomes possible to carry out a stable analysis without causing excessive boiling and condensation even at the time of passage of the liquid surface across a node. Furthermore, by properly estimating the bubble portion below the liquid surface, it becomes possible to correctly predict the liquid surface position even in the case of a large quantity of bubbles contained below the liquid surface.

Embodiment 2

Embodiment 2 will discuss a case in which the two-phase liquid-surface evaluation device is incorporated into an actual plant heat-flow analyzing model. In an actual plant, for example, in the case of a pressurized water type nuclear power plant which is one type of a nuclear power plant, heat generated in the reactor core is taken out by circulating pressurized water, the high temperature, high pressure pressurized water is utilized in a heat exchanger called a vapor generator so as generate vapor, and power generation is carried out by rotating the turbine by using the vapor. A tank, called a pressurizing device, is installed so as to pressurize the pressurized water and control its pressure, and the pressure is maintained constant by utilizing a thermal equilibrium state in the interface between the vapor phase and the liquid phase inside the pressurizing device. This system of the pressurized water is referred to as a primary cooling material system, and a gas-liquid two-phase heat flow analyzing model is used to simulate this system. In particular, this heat flow analyzing model is intended for plant simulators used for a real-time analysis in training plant operators, etc.

The pressurizing device is divided into a number of nodes so as to more specifically simulate the behaviors of the pressurizing device in the primary cooling material system, in particular in the following cases:

The analysis precision on the pressurizing device water level at the time of a depressurized boiling state is improved by modeling the pressurizing device into a number of divisions.

In the case when low-temperature water is poured through the lower portion of the pressurizing device, a temperature gradient is formed inside the pressurizing device so that the analysis precision on the pressure behaviors is improved.

Conventionally, modeling the pressurizing device into a number of divisions is not used in training simulators which require a real-time analysis including a normal operation time, although it is used in a safety analysis used for accident analyses. The reason is explained as follows: The multiple divisions tend to cause discontinuities in calculations, such as pressure spikes and water-level spikes, at the time of a switchover between liquid-surface nodes, and in the case of analyzers familiar with the analyzing model, these are regarded as phenomena occurring merely on the calculations as in the case of analyses in designing; however, in the case of training simulators, these spikes might be regarded as actual plant behaviors.

Figure 9:
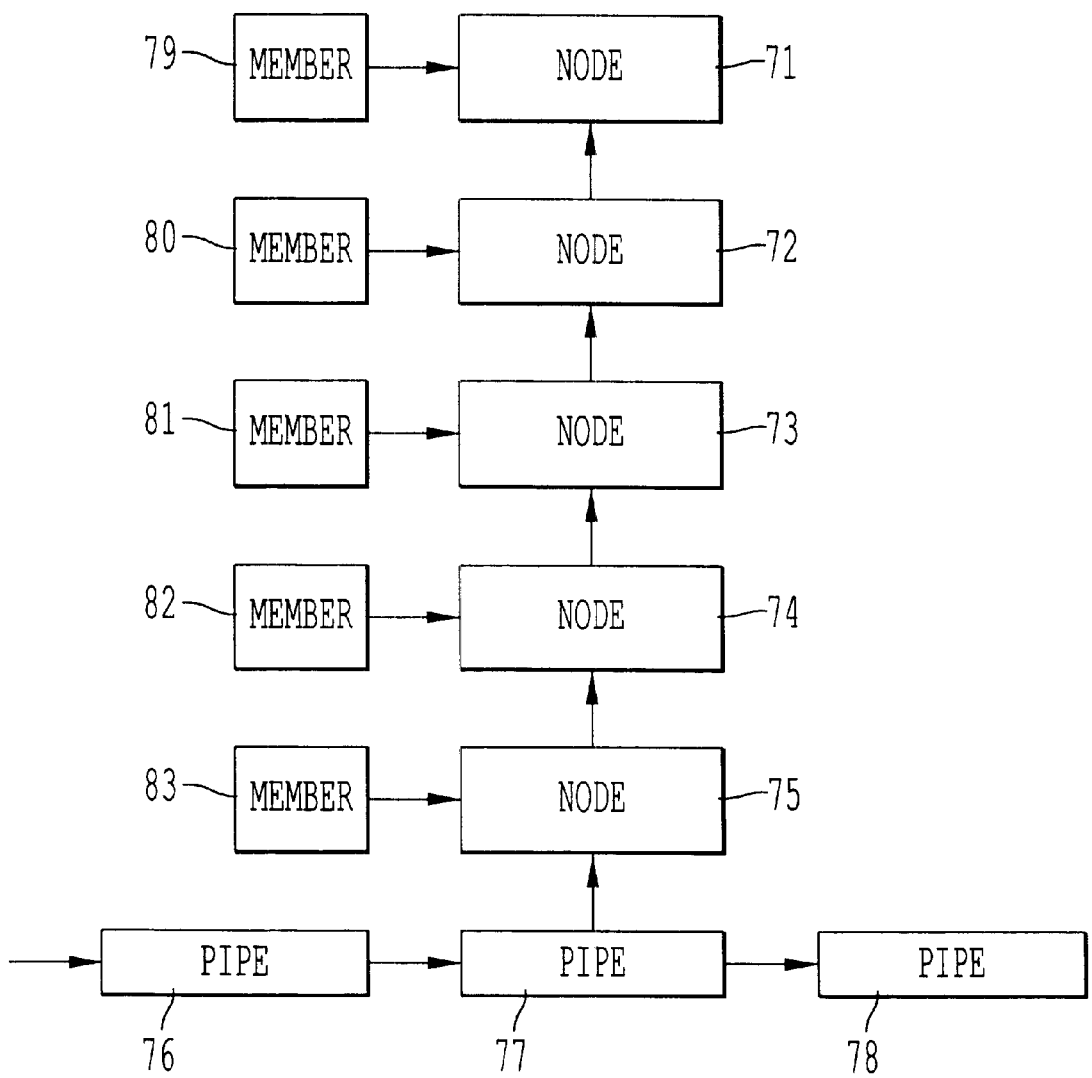
FIG. 9 is a diagram showing the denotation of a pressurizer model in the heat-flow analyzing model incorporating two-phase liquid-surface evaluation device according to the present invention.

FIG. 9 shows an essential portion in the vicinity of the pressurizing device in this primary cooling material system model. Reference numerals 71 through 75 are nodes representing fluids inside the pressurizing device, which are formed by dividing the pressurizing device into five divisions in the vertical direction. Reference numerals 76 through 78 represent one portion of piping connected to the pressurizing device. Reference numerals 79 through 83 represent structural members on the container portion (wall portion) of the pressurizing device at which fluid node and heat and mass transfer are carried out.

The same algorithm for the two-phase liquid-surface evaluation as embodiment 1 is adopted.

Figure 10:
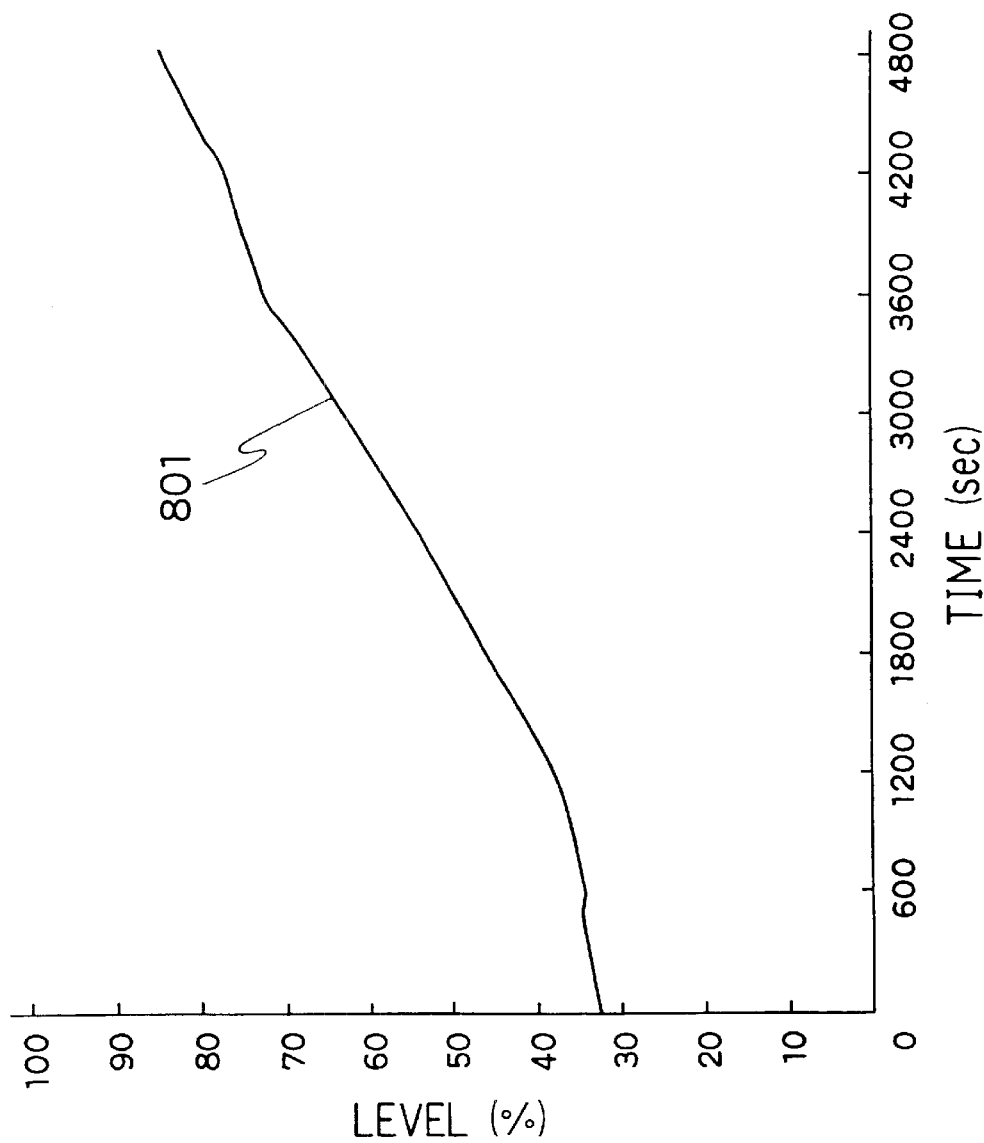
FIG. 10 is a diagram showing the results of heat-flow analysis in the case of liquid-surface elevation according to the model of FIG. 9.
Figure 11A:
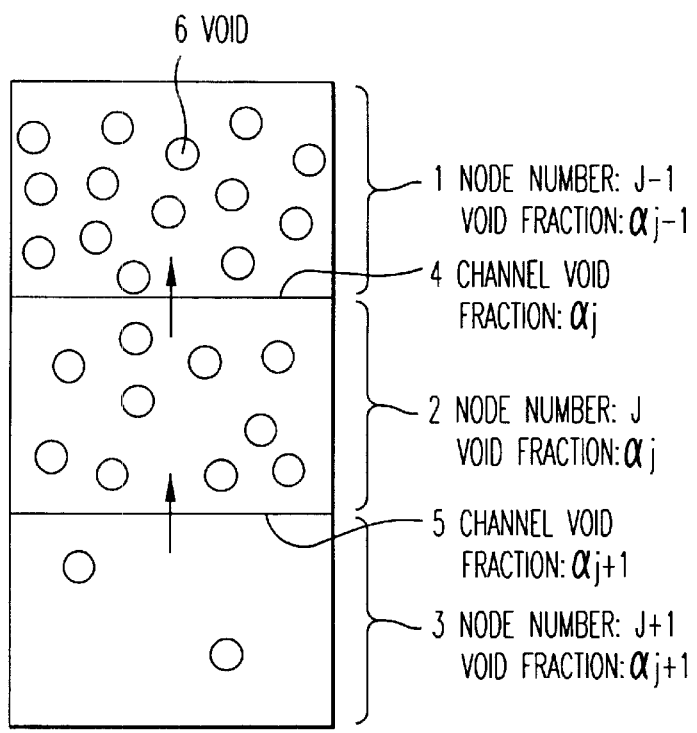
FIG. 11($a$) is a diagram showing a concept of modeling in liquid-surface evaluation in conventional two-phase heat-flow analysis in a case where no liquid-surface model is incorporated.
Figure 11B:
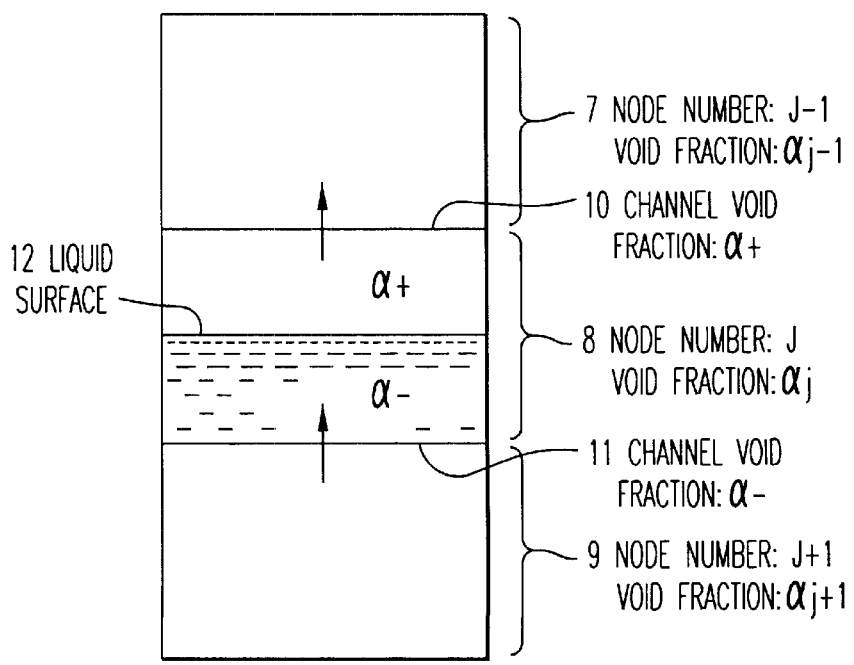

FIG. 10 shows the results of an analysis which simulates a state in which, when water is poured into the pressurizing device through the piping portion, the water level rises. Reference numeral 801 shows the results of the analysis on the water level of the pressurizing device. FIG. 10 shows a case in which the water level rises with the pressure being set at a constant value (28 kg/cm$^2$). Since the pressurizing device is divided into five portions in this analyzing model, nodes switch themselves every 20%; however, the node switching is carried out smoothly so that no discontinuities occur in the water level change, thereby providing smooth analysis results. Here, the rise in the water level is not constant; however, this is not resulted from the liquid-surface evaluation, but from influences from other portions of the plant, since the simulation includes the entire plant.

As described above, one of the effects of the present invention is that a node possessing a liquid surface is properly estimated whether hardly any gaseous phase exists below the liquid surface or a large quantity of gaseous phase exists below the liquid surface. Moreover, the method for evaluating the heat transfer area between the gaseous phase and the liquid phase by properly estimating the ratio of existence between bubbles below the liquid surface and the gaseous phase above the liquid surface makes it possible to provide a stable analysis without causing excessive boiling and condensation at the time of passage of the liquid surface across nodes, whether hardly any gaseous phase exists below the liquid surface or a large quantity of gaseous phase exists below the liquid surface. Furthermore, the method for correctly predicting the liquid-surface position in the case of a large quantity of bubbles contained below the liquid surface by properly estimating the bubble portion below the liquid surface makes it possible to carry out the prediction without causing any discontinuity in the liquid-surface position.

In accordance with the two-phase heat-flow analyzing method related to the first arrangement of the present invention which is a method for analyzing the heat-transfer behaviors of a two-phase fluid flowing through heat-transport equipment, the heat-transport equipment is divided into a plurality of nodes, the void fraction of a gaseous phase above the liquid surface of a node possessing the liquid surface and the void fraction below the liquid surface thereof are calculated based upon the void fraction of the node in question and the void fraction of a node below the node in question, and based upon the results of the calculations, the position of a liquid surface inside the heat-transport equipment is calculated. Therefore, this arrangement provides an effect by which the liquid-level position inside the heat-transport equipment and the shift thereof can be simulated with high precision.

Moreover, in accordance with the two-phase heat-flow analyzing method related to the second arrangement of the present invention, based upon the void fractions of a target node to be judged and nodes located above and below the target node, a judgement is made as to whether or not the target node possesses a liquid surface. Therefore, this arrangement provides an effect by which a judgement is correctly made as to a node possessing a liquid surface.

Furthermore, in accordance with the two-phase heat-flow analyzing method related to the third arrangement of the present invention, based upon the respective void fractions of a target node to be judged and a node located below the target node, the void fraction of a gaseous phase above the liquid surface of the target node and the void fraction below the liquid surface are calculated, and based these void fractions, a judgement is made as to whether or not the target node possesses a liquid surface. Therefore, this arrangement provides an effect by which a judgement is correctly made as to a node possessing a liquid surface.

In accordance with the two-phase heat-flow analyzing method related to the fourth arrangement of the present invention, with respect to the node possessing a liquid surface, the quantity of heat transfer between the two gas-liquid phases is calculated based upon the void fraction of a gaseous phase above the liquid surface and the void fraction below the liquid surface. This arrangement provides an effect by which the quantity of heat transfer between the two gas-liquid phases can be calculated more accurately.

Moreover, in accordance with the two-phase heat-flow analyzing apparatus of the fifth arrangement of the present invention which is an apparatus for analyzing the heat-transfer behaviors of a two-phase fluid flowing through heat-transport equipment, the heat-transport equipment is divided into a plurality of nodes, the void fraction of a gaseous phase above the liquid surface of a node possessing the liquid surface and the void fraction below the liquid surface thereof are calculated based upon the void fraction of the node in question and the void fraction of a node below the node in question, and based upon the results of the calculations, the position of a liquid surface inside the heat-transport equipment is calculated. Therefore, this arrangement provides an effect by which the liquid-level position inside the heat-transport equipment and the shift thereof can be simulated with high precision more smoothly.

Moreover, in accordance with the two-phase heat-flow analyzing apparatus related to the sixth arrangement of the present invention, based upon the void fractions of a target node to be judged and nodes located above and below the target node, a judgement is made as to whether or not the target node possesses a liquid surface. This arrangement provides an effect by which a judgement is correctly made as to a node possessing a liquid surface.

Furthermore, in accordance with the two-phase heat-flow analyzing apparatus related to the seventh arrangement of the present invention, based upon the respective void fractions of a target node to be judged and a node located below the target node, the void fraction of a gaseous phase above the liquid surface of the target node and the void fraction below the liquid surface are calculated, and based upon these void fractions, a judgement is made as to whether or not the target node possesses a liquid surface. This arrangement provides an effect by which a judgement is correctly made as to a node possessing a liquid surface.

In the two-phase heat-flow analyzing apparatus related to the eighth arrangement of the present invention, with respect to the node possessing a liquid surface, the quantity of heat transfer between the two gas-liquid phases is calculated based upon the void fraction of a gaseous phase above the liquid surface and the void fraction below the liquid surface. Therefore, this arrangement provides an effect by which the quantity of heat transfer between the two gas-liquid phases can be calculated more accurately.

What is claimed is:

1. A method of analyzing heat and mass transfer in gas-liquid two-phase flow in an object heat transfer system comprising the steps of:

dividing the object heat transfer system into a plurality of nodes;

calculating a void fraction contribution ($\alpha_{0g}$) in gaseous phase above a liquid surface of a node which includes a liquid surface therein and a void fraction contribution ($\alpha_{01}$) in liquid phase under said liquid surface, based on a void fraction ($\alpha_0$) in said node and a void fraction ($\alpha_1$) in a node one node beneath said node; and calculating a liquid surface level in the surface including node in the heat transfer system based on the calculated void fraction contribution ($\alpha_{0g}$, $\alpha_{01}$).

2. The method of claim 1, including a step of finding a node which includes a liquid surface therein based on void fraction of a candidate node and adjacent nodes above and beneath the candidate node.

3. The method of claim 1, including a step of finding a node which includes a liquid surface therein based on void fraction contribution ($\alpha_{0g}$) in gaseous phase above a liquid surface of a candidate node and that ($\alpha_{01}$) in liquid phase under said liquid surface both calculated from void fraction ($\alpha_0$) of the candidate node and that ($\alpha_1$) of the node one node beneath the candidate node.

4. The method of claim 1, including a step of calculating heat transfer between gaseous phase and liquid phase of a node which includes a liquid surface therein based on void fraction in gaseous phase and that in liquid phase of said node.

5. An apparatus for analyzing heat and mass transfer in gas-liquid two-phase flow in an object heat transfer system comprising:

a calculating means for calculating a liquid surface level of two-phase flow being comprised of a means for finding a node which includes a liquid surface;

a means for finding a gas-liquid interfacial area; and a means for finding liquid level in the two-phase flow, which calculates a liquid surface level of two-phase flow in the object heat transfer system with the steps of dividing the object heat transfer system into a plurality of nodes; calculating a void fraction contribution ($\alpha_{0g}$) in gaseous phase above a liquid surface of a node which includes a liquid surface therein and a void fraction contribution ($\alpha_{01}$) in liquid phase under said liquid surface based on a void fraction ($\alpha_0$) in said node and a void and a void and fraction ($\alpha_1$) in a node one node beneath said node, and calculating liquid surface level in the surface including node in the heat transfer system based on the calculated void fraction contributions ($\alpha_{0g}$, $\alpha_{01}$); and a means for analyzing two-phase flow and a means for containing structural data of the object heat transfer system.

6. The apparatus of claim 5, conducting a step of finding a node which includes a liquid surface therein based on void fraction of a candidate node and adjacent nodes above and beneath the candidate node.

7. The apparatus of claim 5, conducting a step of finding a node which includes a liquid surface therein based on a void fraction contribution ($\alpha_{0g}$) in gaseous phase above a liquid surface of a candidate node and that ($\alpha_{01}$) in liquid phase under said liquid surface both calculated from void fraction ($\alpha_0$) of the candidate node and that ($\alpha_1$) of a node one node beneath the candidate node.

8. The apparatus of claim 5, conducting a step of calculating heat transfer between gaseous phase and liquid phase of a node which includes a liquid surface therein based on void fraction in gaseous phase and that in liquid phase of said node.

* * * * *